United States Patent
Vesterinen

(10) Patent No.: US 8,503,393 B2
(45) Date of Patent: Aug. 6, 2013

(54) METHOD, RADIO SYSTEM, AND BASE STATION

(75) Inventor: Seppo Ilmari Vesterinen, Oulunsalo (FI)

(73) Assignee: Nokia Siemens Networks Oy, Espoo (FI)

(*) Notice: Subject to any disclaimer, the term of this patent is extended or adjusted under 35 U.S.C. 154(b) by 468 days.

(21) Appl. No.: 12/676,922

(22) PCT Filed: Sep. 9, 2008

(86) PCT No.: PCT/EP2008/061910
§ 371 (c)(1),
(2), (4) Date: Mar. 8, 2010

(87) PCT Pub. No.: WO2009/034071
PCT Pub. Date: Mar. 19, 2009

(65) Prior Publication Data
US 2010/0208658 A1    Aug. 19, 2010

(30) Foreign Application Priority Data

Sep. 10, 2007 (FI) .................................... 20075631

(51) Int. Cl.
*H04W 4/00* (2009.01)

(52) U.S. Cl.
USPC .......................................... 370/331; 445/444

(58) Field of Classification Search
USPC .......................................... 370/331; 455/444
See application file for complete search history.

(56) References Cited

U.S. PATENT DOCUMENTS

2005/0286471 A1* 12/2005 Yang et al. ..................... 370/331
2008/0304451 A1* 12/2008 Thompson ..................... 370/331
2009/0029706 A1*  1/2009 Prakash et al. ................ 455/436

OTHER PUBLICATIONS

Nortel et al. (Way Forward for local Breakout with IMS).*
3GPP TSG-RAN WG3 Meeting #56, R3-070977, "Requirement discussion for Home ENB", Kobe, Japan, May 7-11, 2007, 2 pages.
3GPP TSG-RAN WG3 Meeting #56, R3-070978, "HNB mobility scenarios", Kobe, Japan, May 7-11, 2007, 3 pages.
3GPP TSG SA WG2 Architecture—S2#57, S2-071727, "Way forward for Local Breakout with IMS", Apr. 23-27, 2007 Beijing, China, 6 pages.
3GPP TR 23.882 V1.11.0, 3rd Generation Partnership Project; Technical Specification Group Services and System Aspects; 3GPP System Architecture Evolution: Report on Technical Options and Conclusions (Release 7), Jul. 2007, 211 pages.
3GPP TSG SA WG2 Architecture—S2#56, S2-070204, "Procedure to implement Local Breakout function", Jan. 15-19, 2007, Florence, Italy, 4 pages.

(Continued)

*Primary Examiner* — Sai-Ming Chan
(74) *Attorney, Agent, or Firm* — Harrington & Smith

(57) ABSTRACT

There is provided a method including providing a local breakout service to an Internet protocol gateway while retaining user access control and a remote Internet protocol gateway of a packet core network of a radio network for a mobile terminal; providing information on neighboring macro cells in which the local breakout service can continue, the macro cells belonging to a network using another tracking area than that of the serving cell of the mobile terminal; executing a handover process of the mobile terminal from a source base station in the serving cell of the mobile terminal to a target base station in a neighboring macro cell; and providing session continuation of the mobile terminal local breakout service traffic in the neighboring macro cell by controlling user plane tunneling between the target base station and the local packet switched network from which an Internet protocol address for the local breakout service was assigned.

23 Claims, 20 Drawing Sheets

OTHER PUBLICATIONS

3GPP TSG SA WG2 Architecture—S2#56, S2-070093, "Service Continuity and Routing Optimization", Jan. 15-19, 2007, Florence, Italy, 4 pages.

3GPP TSG SA WG2 Architecture—52#57, S2-071753, "Local breakout concepts for Intra-PLMN", Apr. 23-27, 2007, Beijing, China, 5 pages.

3GPP TSG SA WG2 Architecture—SAE Ad-Hoc, S2-062716, "MME/UPE relocation and Concepts of Service continuity and Optimal routing and local breakout.", Aug. 23-25, 2006, Sophia Antipolis, France, 6 pages.

* cited by examiner

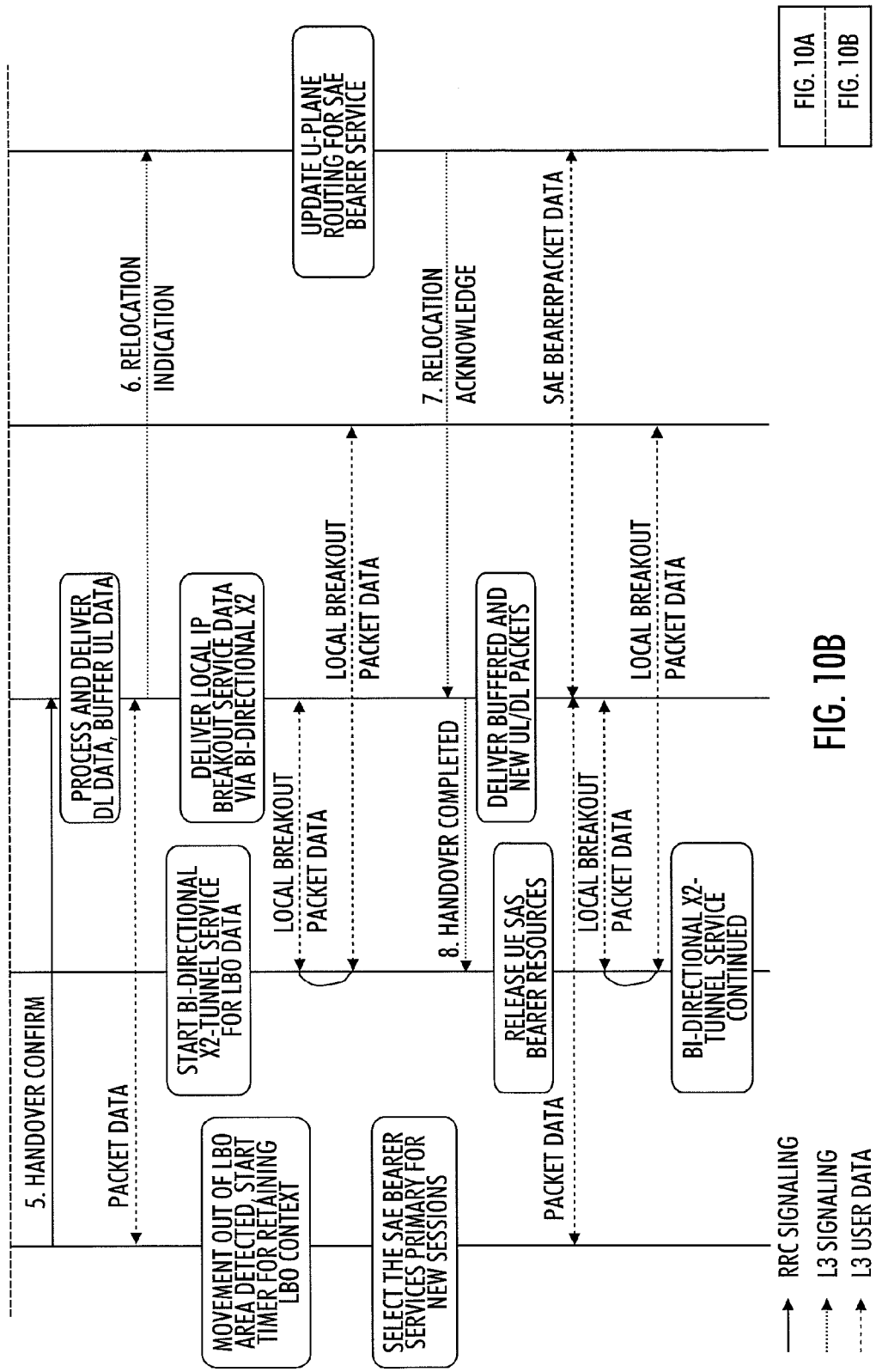

METHOD, RADIO SYSTEM, AND BASE STATION

FIELD

The invention relates to a method, to a radio system, to a base station, to a mobile terminal, and to a computer program distribution medium.

BACKGROUND

Cellular operators may nowadays offer a local IP (Internet protocol) connectivity within a certain area (local IP breakout) without roaming, with limited user mobility and IP session continuation being an alternative to the ordinary cellular packet data services with roaming and global mobility support. Such local IP connectivity may be provided within a local zone in a city center or any limited geographical area, an enterprise network or a home where radio coverage is available. In minimum, this kind of local IP breakout can be provided using one radio cell/base station and it may be expanded to a wide radio coverage area in the operator's nation wide domain (PLMN). For example, LTE/SAE (long term evolution/system architecture evolution) service with roaming, and global/Inter radio access mobility with IP session continuation may be overlapping and may share the same cells/base stations that provide the local IP breakout service.

The default user IP connectivity using a SAE gateway that provides global roaming and mobility support can be available in parallel with LBO (local breakout) services that use a Local IP GW (access router) in the local IP breakout service area. It would be desirable to provide session continuation for an ongoing LBO sessions while the user equipment (UE) happens to move out of the local IP breakout service area, e.g. user is leaving an office or a Home Base Station having an active VoIP call.

Network access to ordinary cellular packet data services is enabled e.g. in LTE/SAE via the cellular operator's core network that provides global roaming and mobility support. Normally UE (user equipment, mobile terminal) is connected to the radio network, such as E-UTRAN (enhanced universal terrestrial radio access network) in the LTE/SAE of this example, in a way that a SAE gateway that is located in the core network provides an IP point of attachment to the UE. The selection of this gateway takes place during an Initial Attach procedure when the UE is also authenticated and authorized to use the network services. The SAE gateway can be selected either from the visited PLMN (public mobile network) or the UE's home PLMN, depending on the roaming agreement between the operators. If a SAE gateway is selected from the visited PLMN, a "local breakout" with roaming is in question.

When the UE moves out of the local IP breakout service area, the user traffic using the current IP address for the LBO services is no more routable to the UE in the access network as the new base station may be located in an incorrect IP subnet in the IP network topology at the transport layer. Normally such a situation would mean breaking the active LBO session because the current IP address would no more be routable to reach the UE. A mobile IP could provide IP session continuation out of the LBO service area but that would require using a home agent (HA) service, i.e. an external access router higher in the IP network topology providing the actual user IP point of attachment. Thus, the mobile IP follows the idea of a single switch providing only "long distance calls" like it is with using the centralized SAE GW in the standard LTE/SAE architecture. One of the main ideas in the local IP breakout is, however, to provide optimized local routing, i.e. local calls in a cellular network.

Even if it is assumed that the SAE bearer services will be available in parallel, it is not possible to switch in the UE to use the IP address/APN for the SAE bearer services as this address is different than the IP address for the LBO services. Changing an IP address during a session would automatically break the LBO service (no means to indicate to the corresponding node(s) about the changed IP address).

Several home base station (Femto base station, home eNB, HNB etc.) vendors have proposed an architecture where eNB/(MME)/SAE GW functions are integrated to a Femto (i.e. home) base station in order to get local breakout directly from the Femto base station to e.g. Internet. The drawback of this solution is that the IP session cannot be maintained if the UE moves out of the Femto cell coverage. When the UE moves to a macro cell, it needs to use a SAE bearer from a SAE GW located in the operator's network.

In a known contribution of 3GPP TSG-RAN WG3 R3-070977, Kobe, Japan, 7-11 May 2007: "Requirement discussion for Home ENB", a requirement for a direct communication between two UEs in the same home base station (H-NB) without a CN (core network) user plane intervention is proposed. The same contribution also proposes a requirement for UE movement from an H-NB to a macro cell without service downgrade compared to ordinary Inter-eNB handover. However, in the second contribution (R3-070978), the mobility scenario for LTE HNB→LTE MACRO is described only in LTE Idle mode. However, there cannot be found any solutions for session continuation in LTE active mode while the UE moves out of the H-NB coverage area.

BRIEF DESCRIPTION OF THE INVENTION

An object of the invention is to provide an improved method, a radio system, a source base station, a target base station, a mobile terminal and a computer program distribution medium.

According to an aspect of the invention, there is provided a method comprising: providing a local breakout service to an Internet protocol gateway while retaining user access control and a remote Internet protocol gateway of a packet core network of a radio network for a mobile terminal; providing information on neighboring macro cells in which the local breakout service can continue, the macro cells belonging to a network using another tracking area than that of the serving cell of the mobile terminal; executing a handover process of the mobile terminal from a source base station in the serving cell of the mobile terminal to a target base station in a neighboring macro cell; and providing session continuation of the mobile terminal local breakout service traffic in the neighboring macro cell by controlling user plane tunneling between the target base station and the local packet switched network from which an Internet protocol address for the local breakout service was assigned.

According to another aspect of the invention, there is provided a radio system, comprising: a source base station in the serving cell of a mobile terminal configured to provide a local breakout service to an Internet protocol gateway while retaining user access control and a remote Internet protocol gateway of a packet core network of a radio network for the mobile terminal; to provide information on neighboring macro cells in which the local breakout service can continue, the macro cells belonging to a network using another tracking area than that of the serving cell; and to make a handover decision based on measurement reports received from the mobile terminal; a target base station in a neighboring macro cell configured to execute the handover process with the source base station of the mobile terminal once the handover decision has been made, wherein the radio system is further configured to provide session continuation of the mobile terminal local breakout service traffic in the neighboring macro cell by controlling user plane tunneling between the target base station and the local packet switched network from which an Internet protocol address for the local breakout service was assigned.

According to another aspect of the invention, there is provided a source base station in the serving cell of a mobile terminal of a radio network, comprising: a communication unit configured to communicate with at least one mobile terminal, and with a local breakout service network providing Internet protocol gateway services. The base station further comprises: a processing unit configured to provide the local breakout service to the Internet protocol gateway while retaining user access control and a remote Internet protocol gateway of a packet core network of the radio network for a mobile terminal; a communication unit configured to provide information on neighboring macro cells in which the local breakout service can continue, the macro cells belonging to a network using another tracking area than that of the serving cell of the mobile terminal; a processing unit configured to execute a handover process of the mobile terminal from the source base station to a target base station in a neighboring macro cell; and a processing unit configured to provide session continuation of the mobile terminal local breakout service traffic in the neighboring macro cell by controlling user plane tunneling between the target base station and the local packet switched network from which an Internet protocol address for the local breakout service was assigned.

According to another aspect of the invention, there is provided a target base station for co-operation with the radio system of claim 10 in a macro cell belonging to a network using another tracking area than that of the serving cell of the mobile terminal, the target base station comprising: a communication unit configured to communicate with at least one mobile terminal, and with a local breakout service network providing Internet protocol gateway services, the base station further comprising: a processing unit configured to execute a handover process of the mobile terminal from the source base station to the target base station; and a processing unit configured to provide session continuation of the mobile terminal local breakout service traffic in the macro cell by controlling user plane tunneling between the target base station and the local packet switched network from which an Internet protocol address for the local breakout service was assigned.

According to another aspect of the invention, there is provided a mobile terminal for co-operation with the radio system of claim 10, the mobile terminal comprising: a communication unit configured to communicate with the source base station and the target base station, and a processing unit configured to provide session continuation of the mobile terminal local breakout service traffic in the neighboring macro cell by controlling user plane tunneling between the target base station and the local packet switched network from which an Internet protocol address for the local breakout service was assigned.

According to another aspect of the invention, there is provided a computer program distribution medium readable by a computer and encoding a computer program of instructions for executing a computer process, the process comprising: providing a local breakout service to an Internet protocol gateway while retaining user access control and a remote Internet protocol gateway of a packet core network of a radio network for a mobile terminal; providing information on neighboring macro cells in which the local breakout service can continue, the macro cells belonging to a network using another tracking area than that of the serving cell of the mobile terminal; executing a handover process of the mobile terminal from a source base station in the serving cell of the mobile terminal to a target base station in a neighboring macro cell; and providing session continuation of the mobile terminal local breakout service traffic in the neighboring macro cell by controlling user plane tunneling between the target base station and the local packet switched network from which an Internet protocol address for the local breakout service was assigned.

According to another aspect of the invention, there is provided a computer program product comprising program code which, when run on a processor, executes a method, comprising: providing a local breakout service to an Internet protocol gateway while retaining user access control and a remote Internet protocol gateway of a packet core network of a radio network for a mobile terminal; providing information on neighboring macro cells in which the local breakout service can continue, the macro cells belonging to a network using another tracking area than that of the serving cell of the mobile terminal; executing a handover process of the mobile terminal from a source base station in the serving cell of the mobile terminal to a target base station in a neighboring macro cell; and providing session continuation of the mobile terminal local breakout service traffic in the neighboring macro cell by controlling user plane tunneling between the target base station and the local packet switched network from which an Internet protocol address for the local breakout service was assigned.

The invention provides several advantages. The UE that is normally registered into an LTE/SAE network may select a local IP connectivity (IP point of attachment) to Intranet, or Internet services directly from the LTE cell(s)/base station(s) and the next hop access router, or any access router serving as a gateway to the local IP routing area and the network is capable to support local area mobility within the local IP breakout service area. WLAN type services are enabled in LTE/SAE without requiring multiple radios in terminals. LTE has capability to become the dominant and best available radio. The problem of limited mobility with IP session continuation (IP address change required when switching to/from ordinary SAE bearer services) with an H-EB or eNBs providing LBO services in a limited area is overcome in this invention.

LIST OF DRAWINGS

In the following, the invention will be described in greater detail with reference to embodiments and the accompanying drawings, in which FIG. 1 shows an example of a radio system;

Figure 7A:
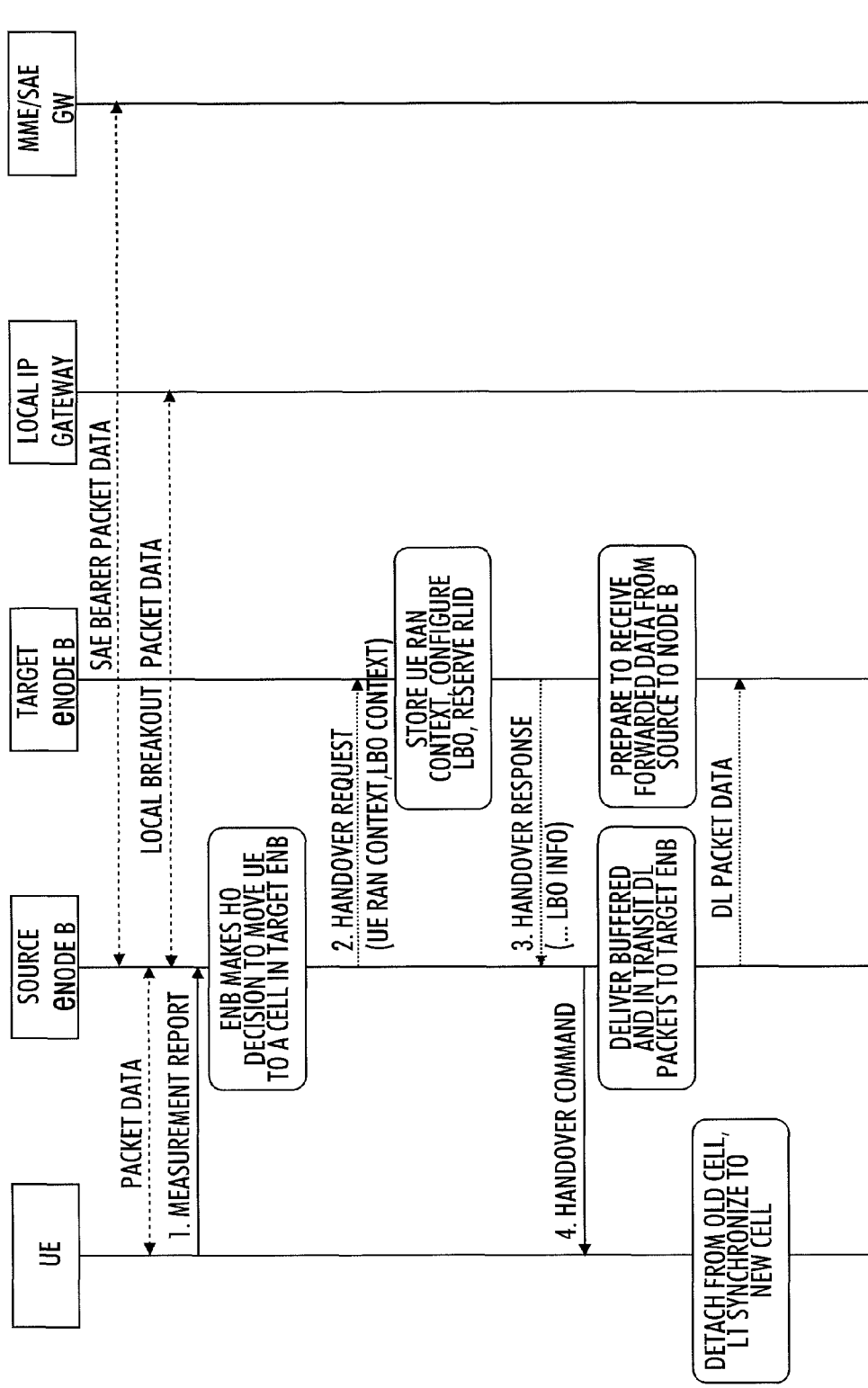
Figure 7B:
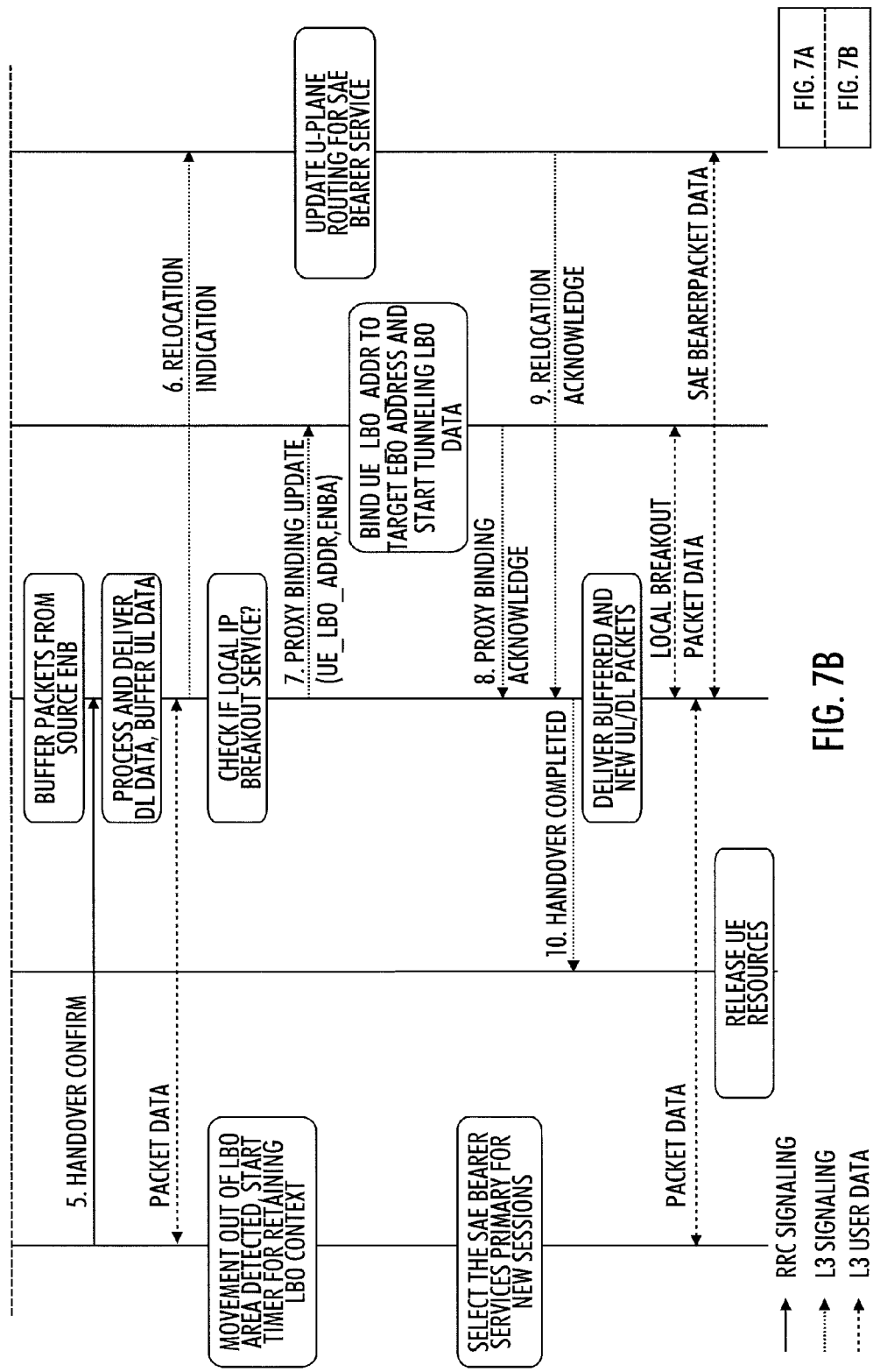
Figure 8:
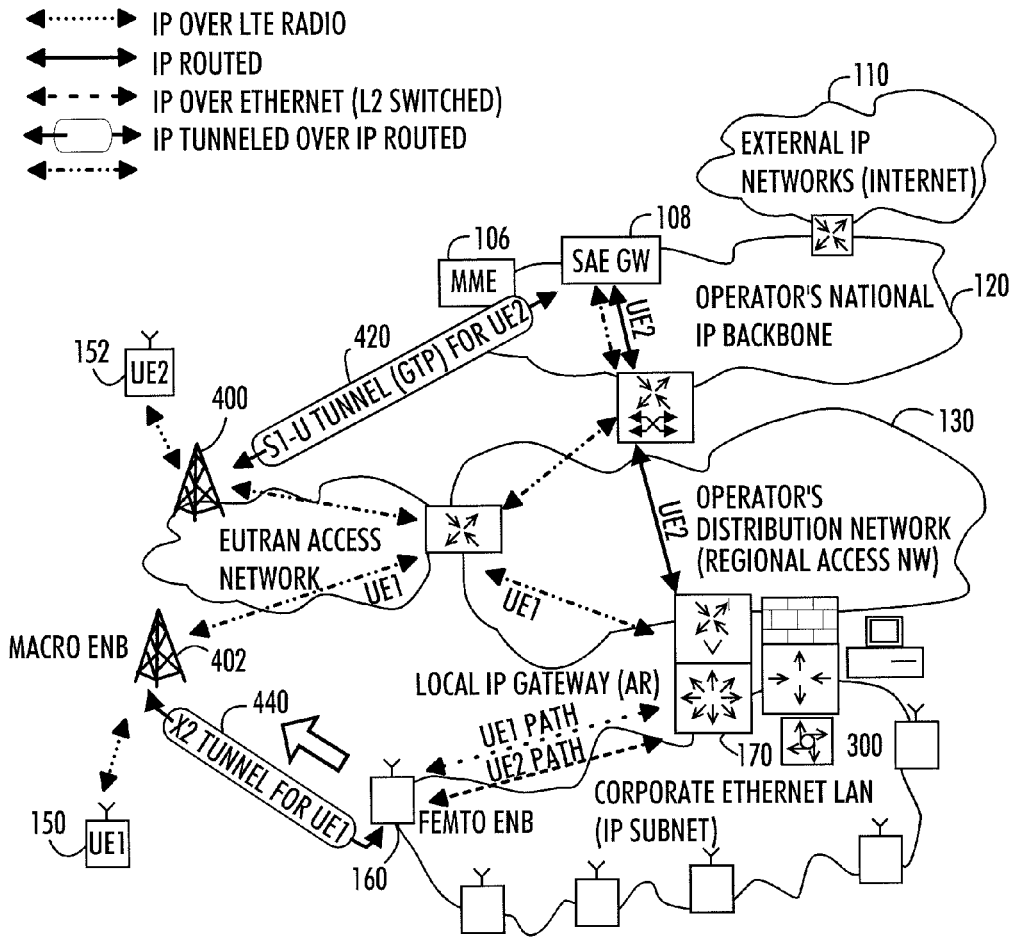
Figure 9:
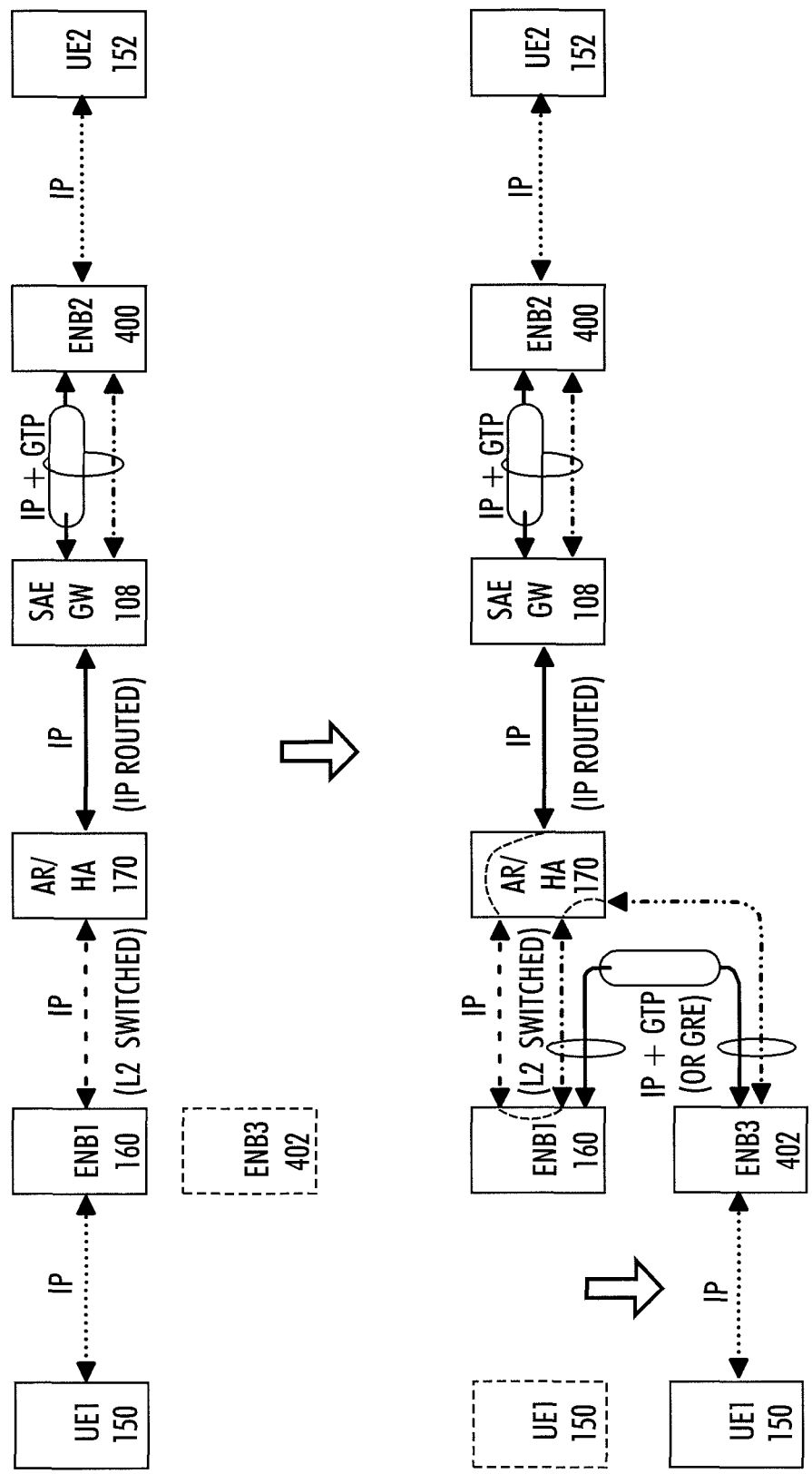
Figure 10A:
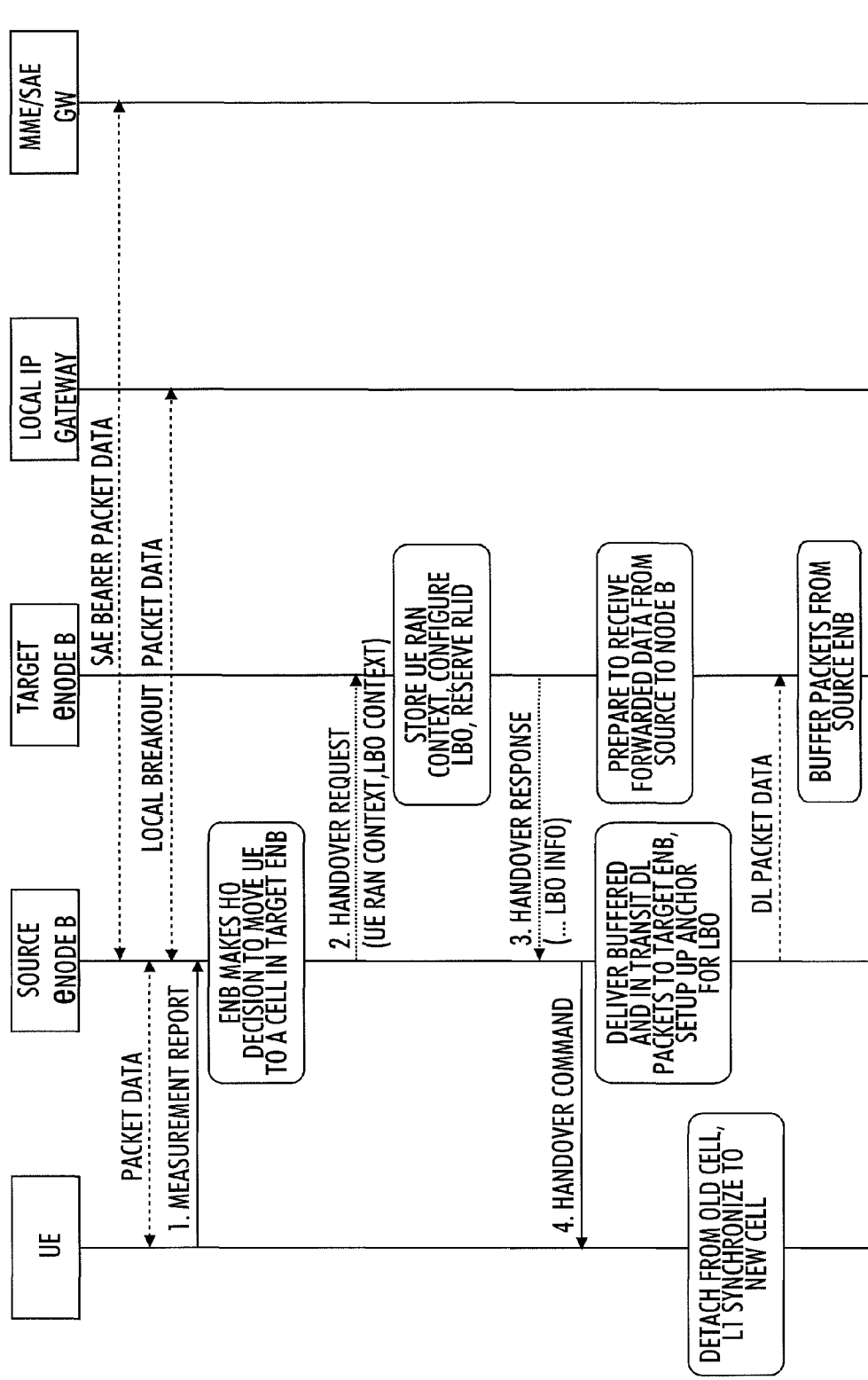
Figure 11:
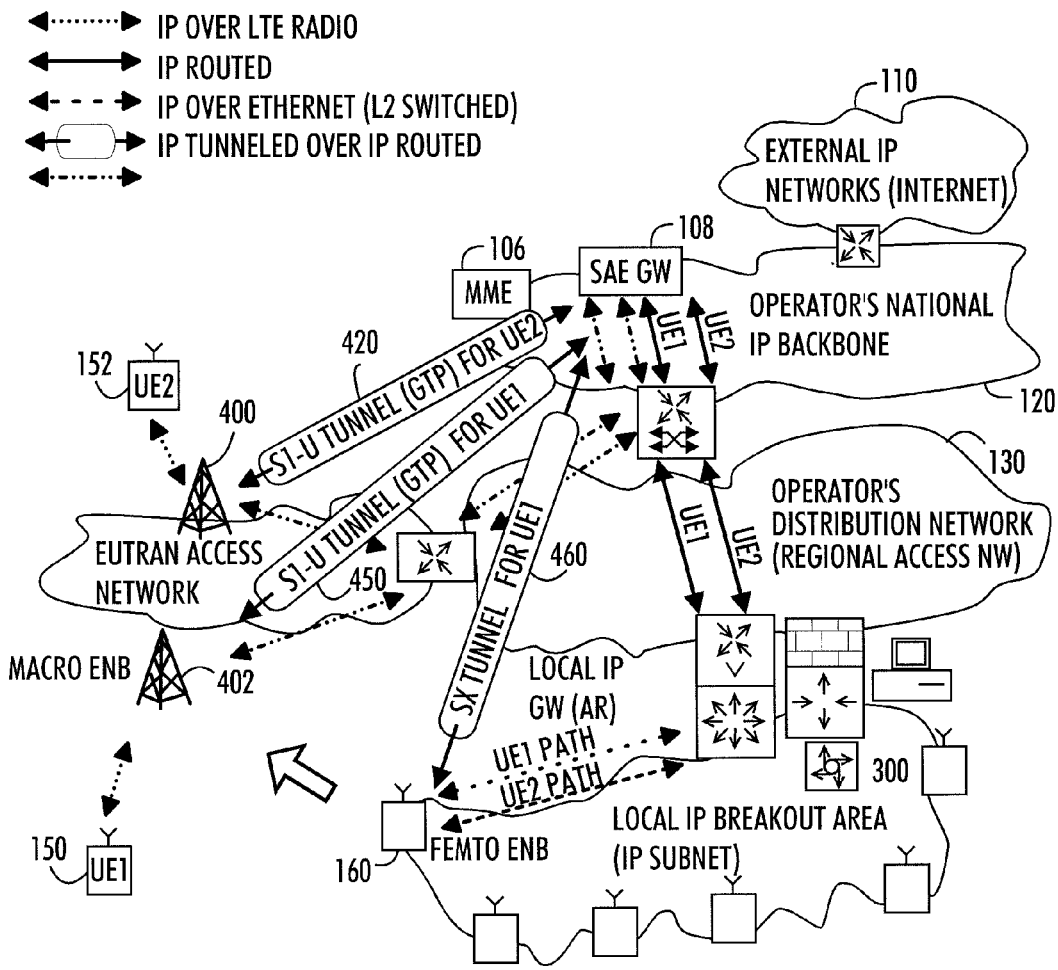
Figure 12:
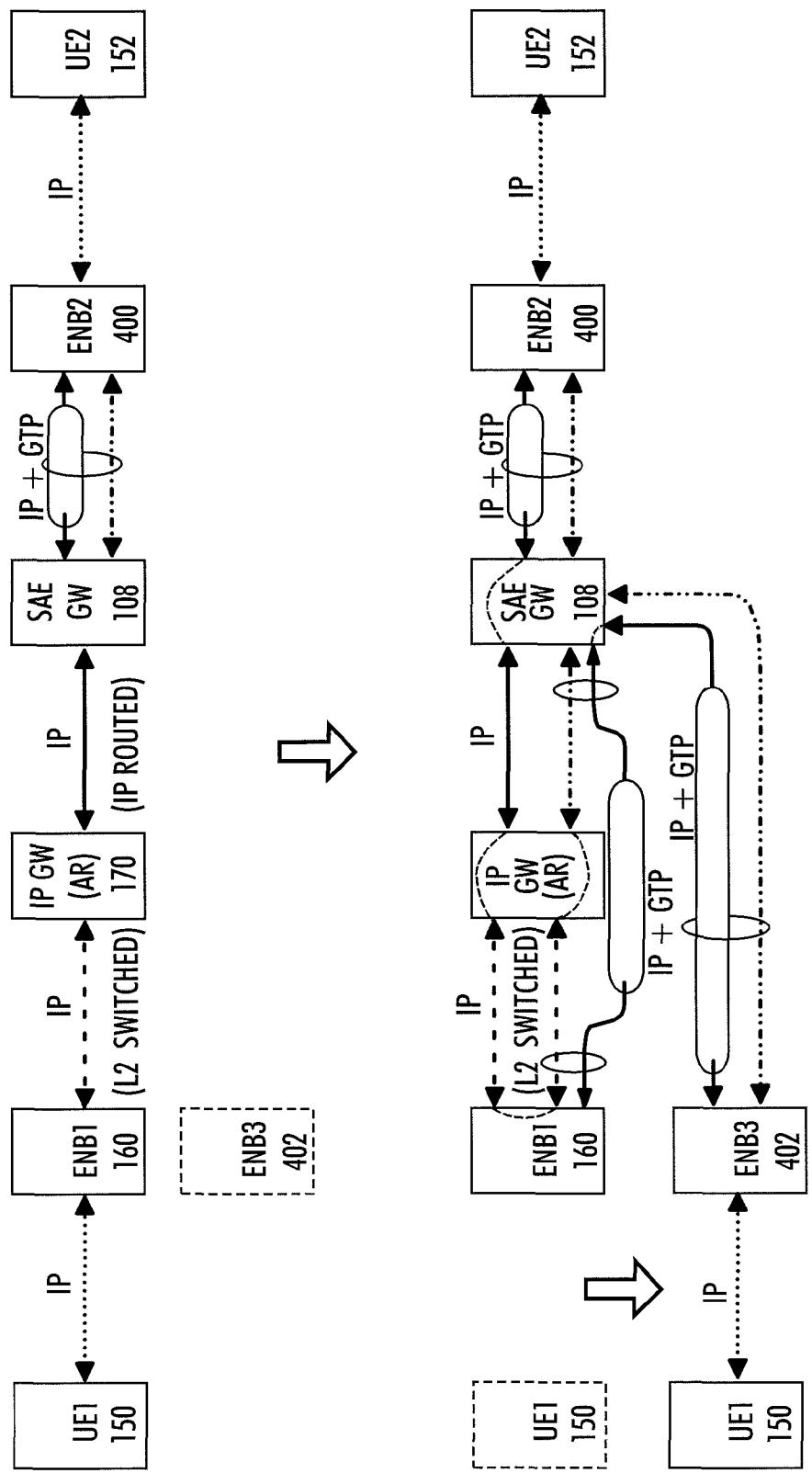
Figure 13A:
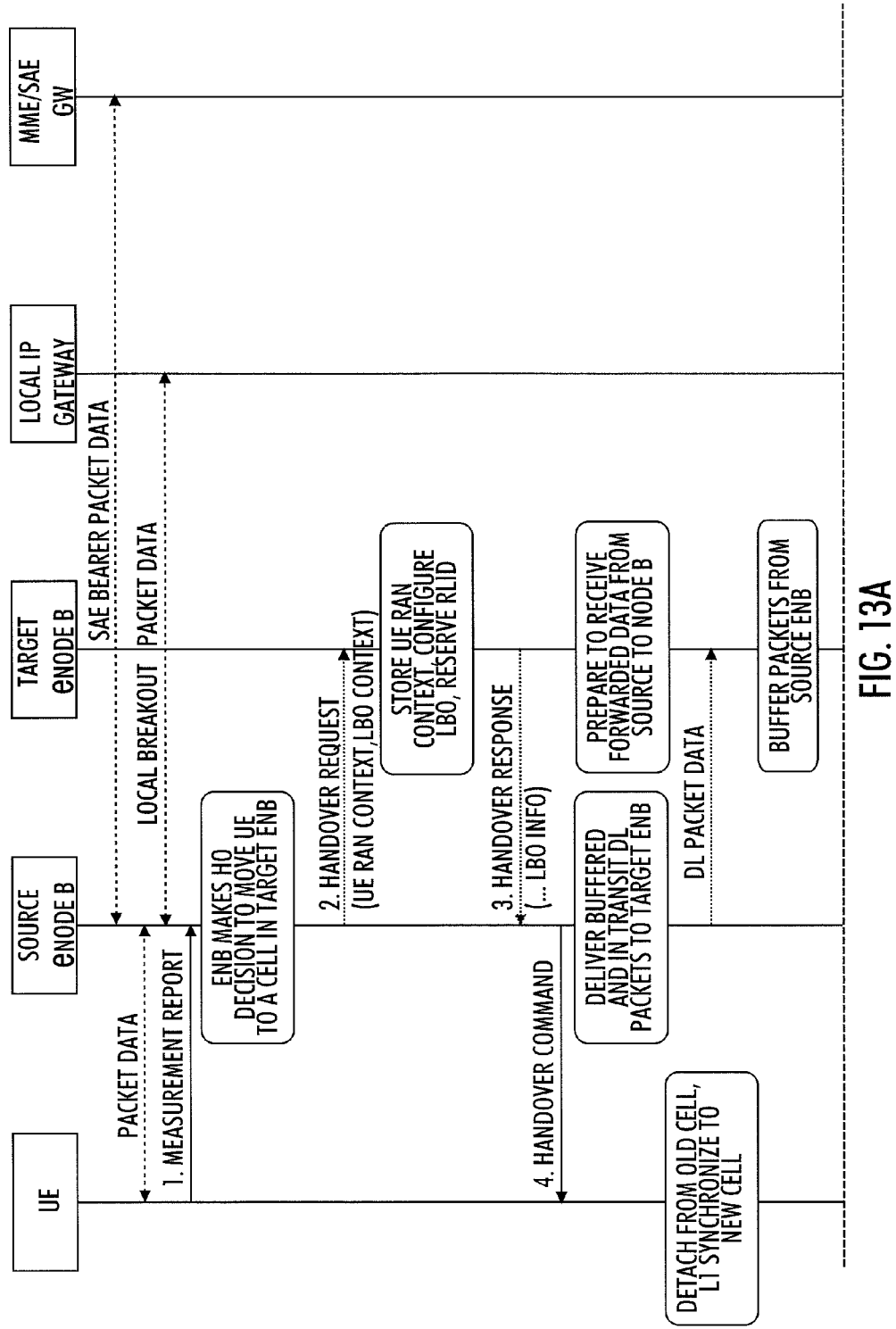
Figure 13B:
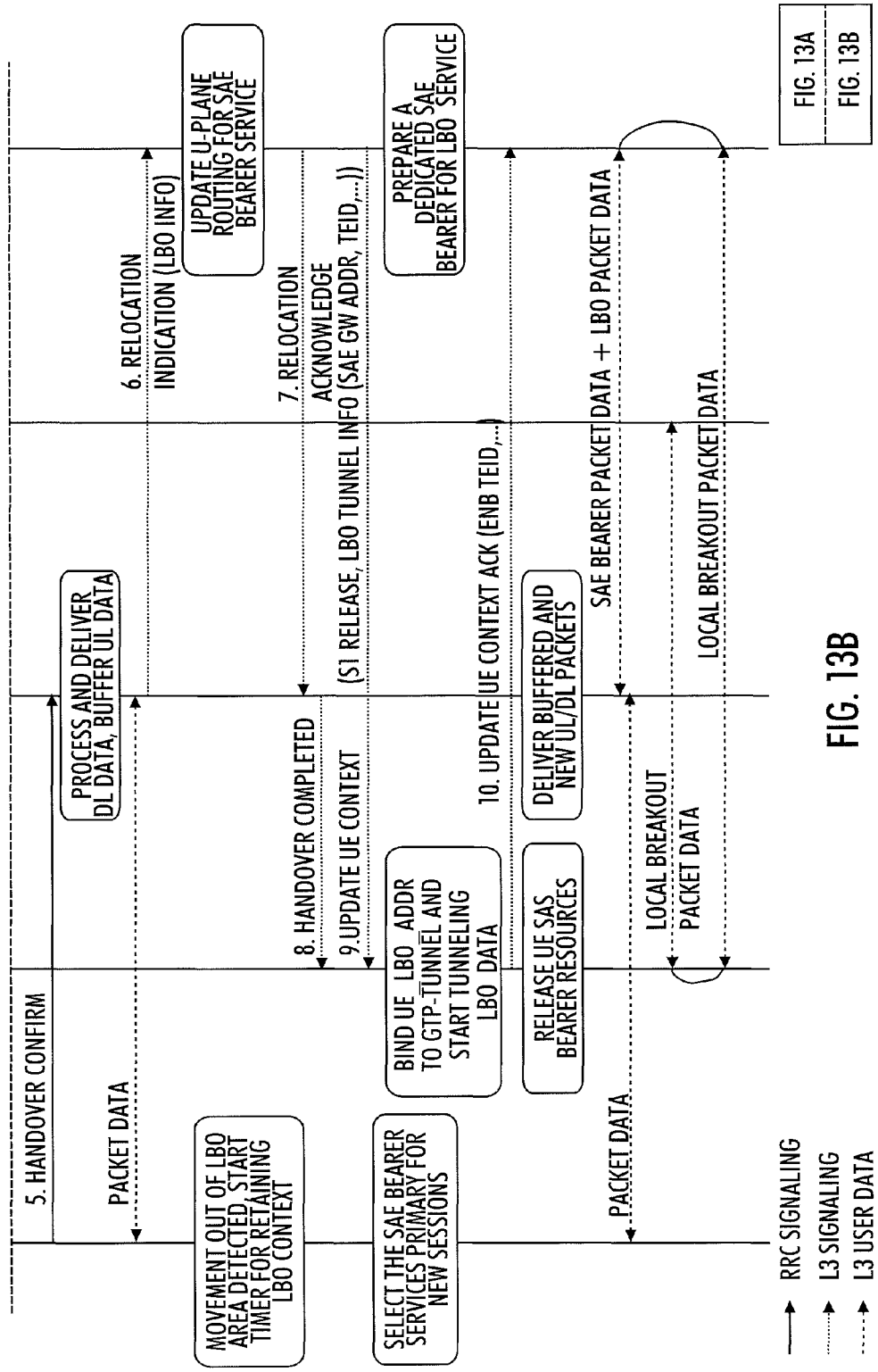
Figure 14:
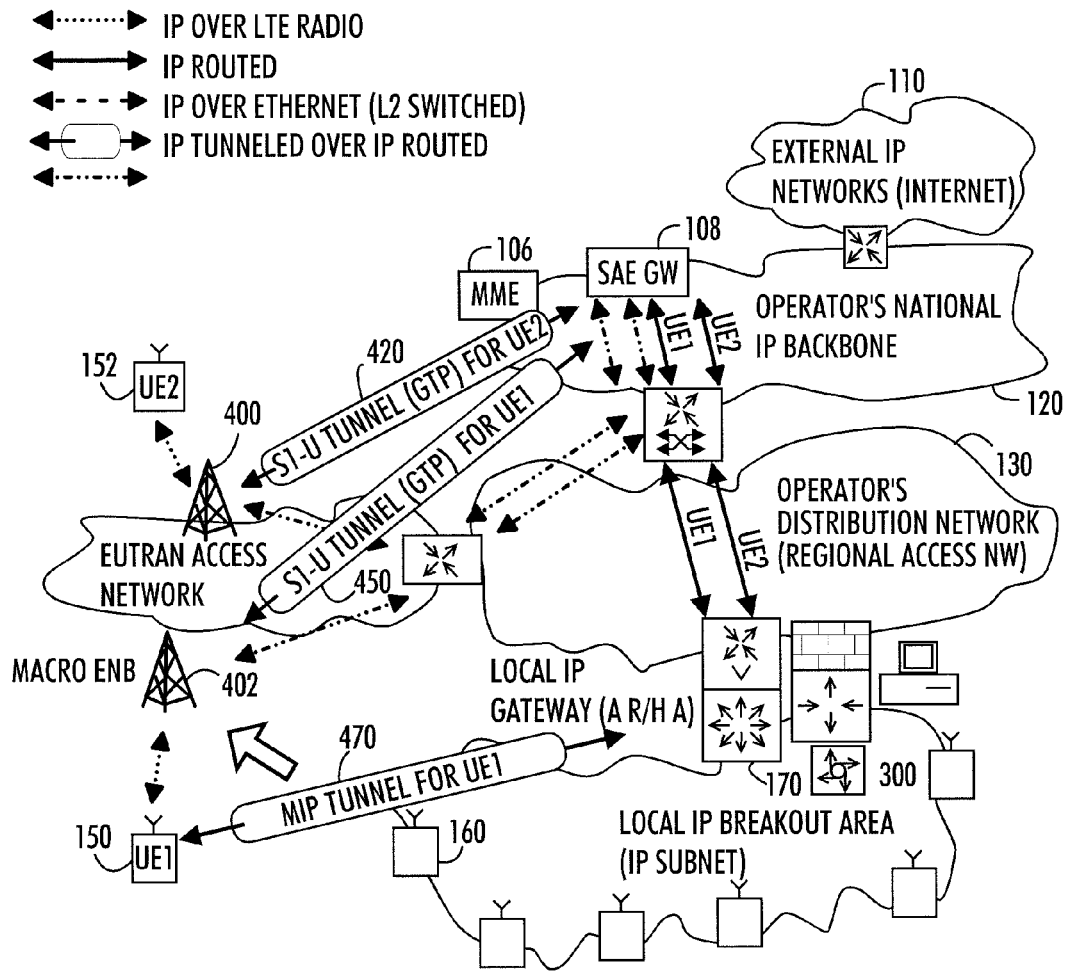
Figure 15:
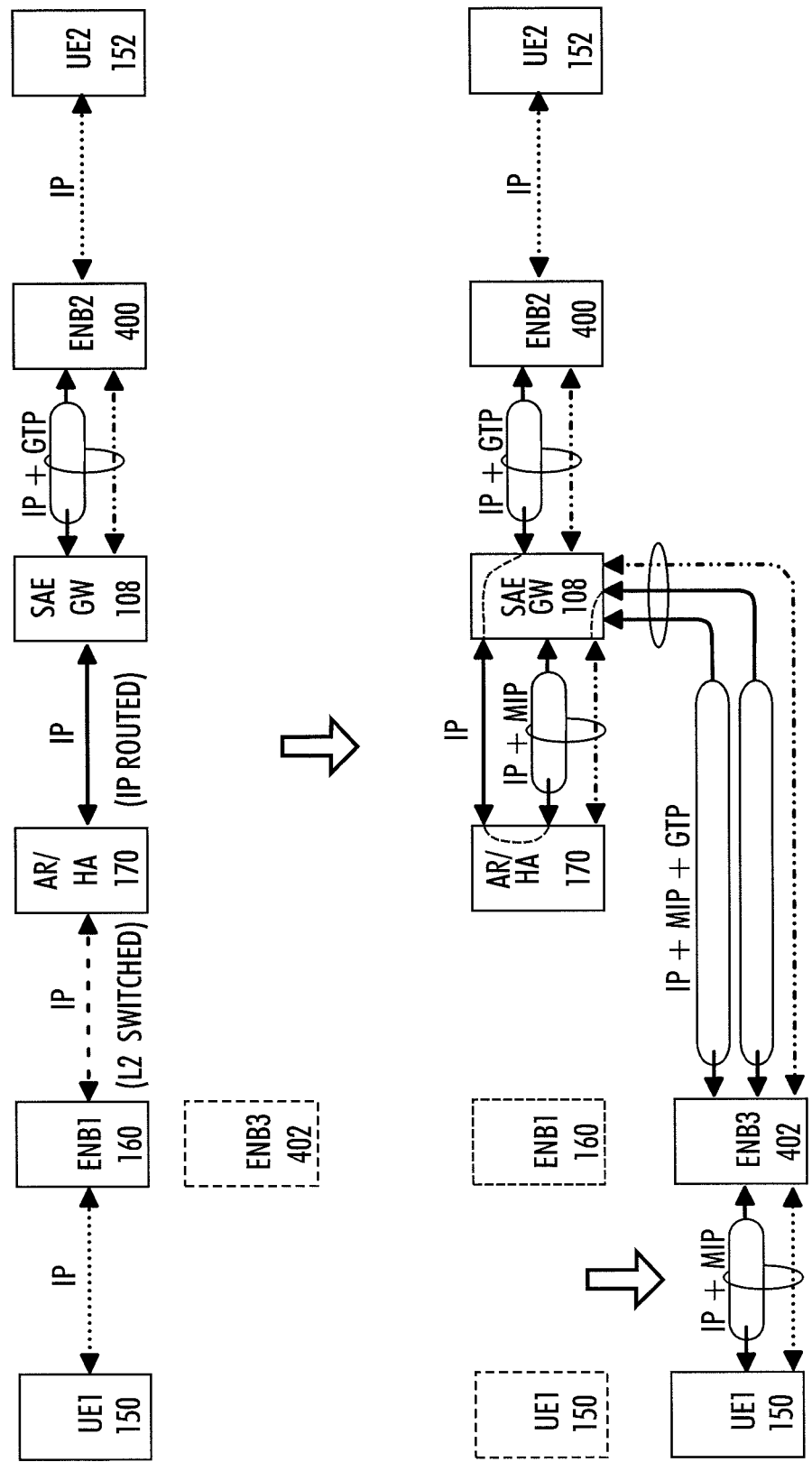
Figure 16A:
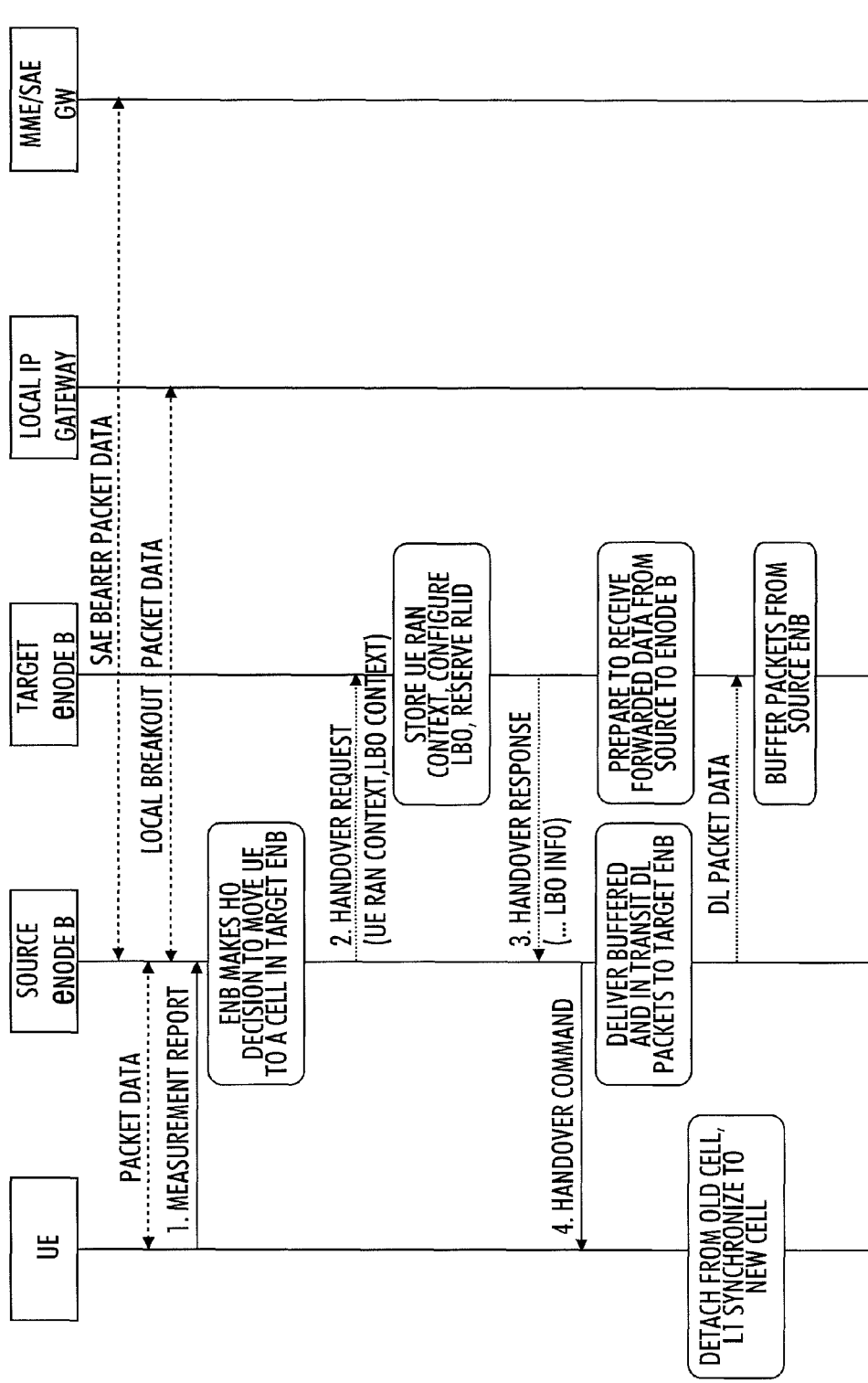
Figure 16B:
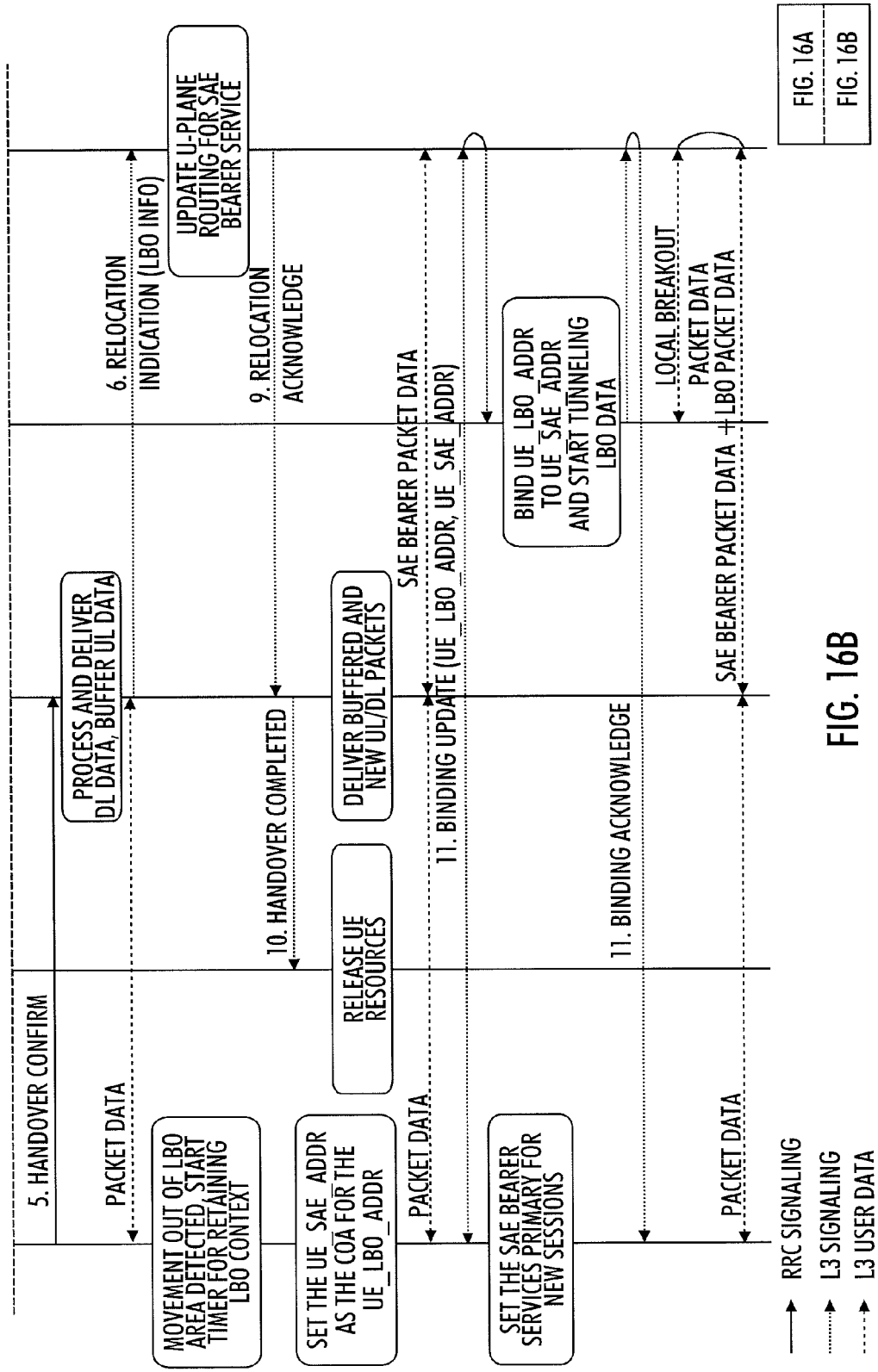
Figure 17:
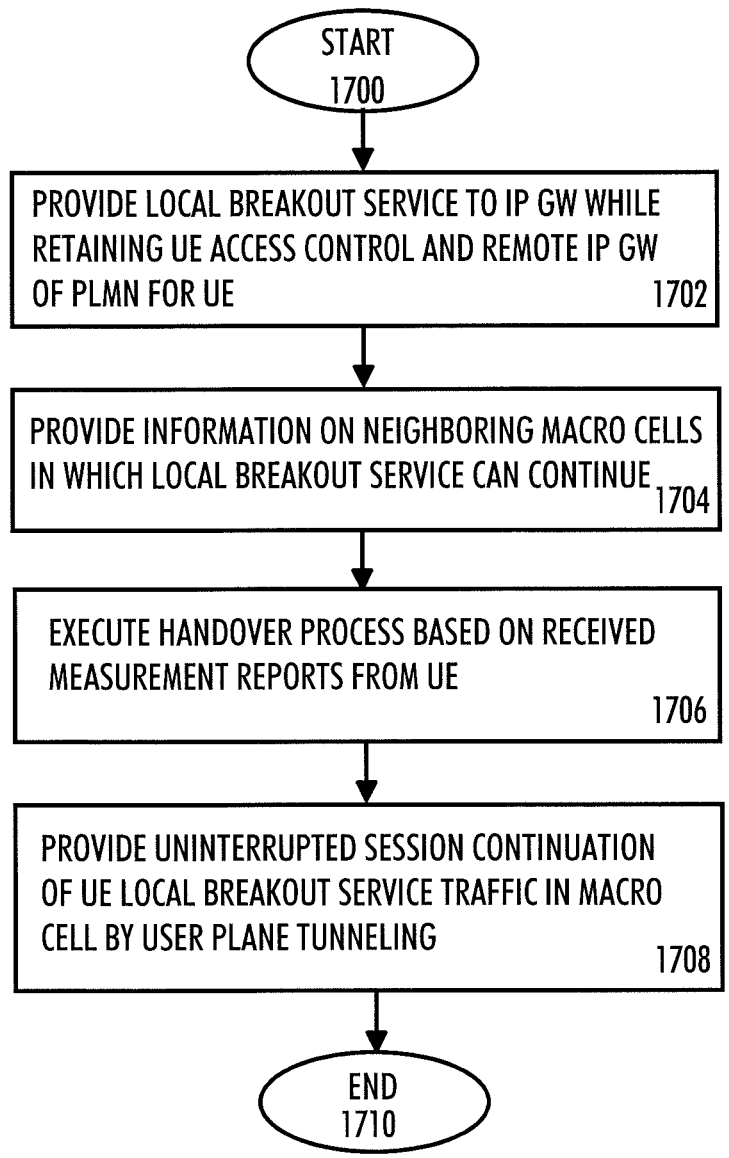

FIG. 7, represented with FIGS. 7A and 7B, is a signal sequence diagram illustrating an example of a signaling flow for inter eNB handover outside the LBO service area using PMIP;

FIG. 8 illustrates an example of data path after inter eNB handover outside the LBO service area using bi-directional X2-tunnel;

FIG. 9 illustrates an example of data paths in inter eNB handover outside the LBO service area using bi-directional X2-tunnel;

FIG. 10, represented with FIGS. 10A and 10B, is a signal sequence diagram illustrating an example of a signaling flow for inter eNB Handover outside the LBO service area using bi-directional X2-tunnel;

FIG. 11 illustrates an example of data path after inter eNB handover outside the LBO service area using GTP-tunnel via the SAE GW;

FIG. 12 illustrates an example of data paths in inter eNB handover outside the LBO service area using GTP-tunnel via the SAE GW;

FIG. 13, represented with FIGS. 13A and 13B, is a signal sequence diagram illustrating an example of a signaling flow for inter eNB handover outside the LBO service area using GTP-tunnel via the SAE GW;

FIG. 14 illustrates an example of data path after UE movement outside LBO Area using client MIP;

FIG. 15 illustrates an example of data paths in inter eNB handover outside LBO area using client mobile IP;

FIG. 16, represented with FIGS. 16A and 16B, is a signal sequence diagram illustrating an example of a signaling flow for inter eNB handover outside the LBO service area using client mobile IP; and FIG. 17 shows an example of a method according to an embodiment of the invention.

FIGS. 7A and 7B are referred in the description as FIG. 7.
FIGS. 10A and 10B are referred in the description as FIG. 10.
FIGS. 13A and 13B are referred in the description as FIG. 13.
FIGS. 16A and 16B are referred in the description as FIG. 16.

DESCRIPTION OF EMBODIMENTS

Figure 1:
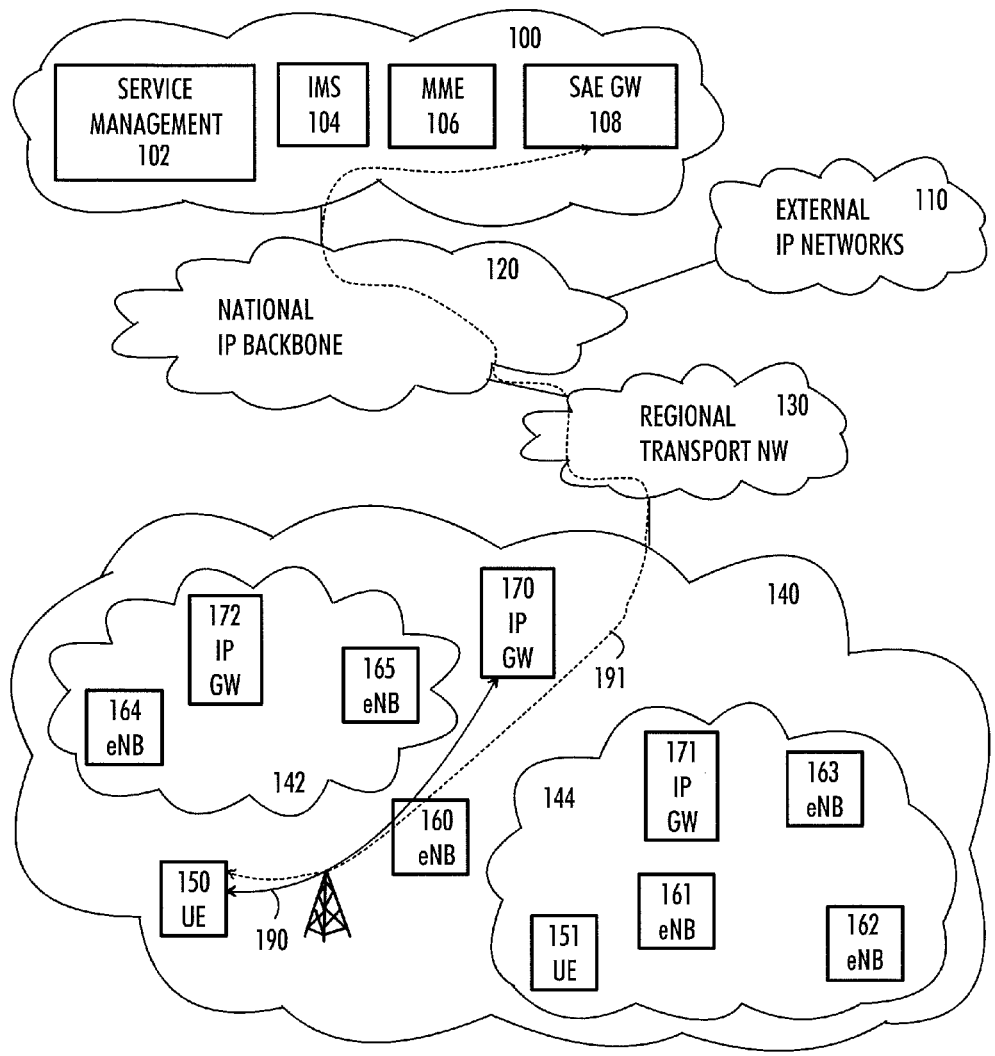

With reference to FIG. 1, examine an example of a radio system to which embodiments of the invention can be applied. In this example, the radio system is based on LTE/SAE (long term evolution/system architecture evolution) network elements. However, the invention described in these examples is not limited to the LTE/SAE radio systems but can also be implemented in other radio systems, such as HSDPA (high speed downlink packet access), HSUPA (high speed uplink packet access), WIMAX (worldwide interoperability for microwave access), Internet HSPA, or in other suitable radio systems.

The exemplary radio system of FIG. 1 comprises a service core 100 of an operator including the following elements: a service management 102, IMS (IP multimedia subsystem) 104, an MME (mobility management entity) 106, and an SAE GW (SAE gateway) 108.

Traffic between mobile terminals 150, 151 and the service core network 100 is carried via a national IP backbone network 120, a regional trans-port network 130, and a local area aggregation network 140. eNBs (enhanced node Bs) 160 to 165 of the radio system host the functions for radio resource management: radio bearer control, radio admission control, connection mobility control, dynamic resource allocation (scheduling). The MME 106 is responsible for distributing paging messages to the eNBs 160 to 165.

Usually radio networks are based on a single switch model. This is implemented in the LTE/SAE network by the SAE GW (SAE gateway) 108. All calls/services are "long distance" due to forcing user traffic to pass via the SAE GW 108. For example, a connection from a mobile terminal 150 to external IP networks 110, such as to the Internet 110, is typically guided via a route indicated with a dashed line 191. However, the embodiments of the invention use "local calls/services" also in the mobile networks.

In the following examples, selecting and connecting to an ordinary IP gateway 170 to 172 (Access Router) for a local IP breakout from a LTE base station 160 to 165 while retaining user access control and SAE GW 108 in the LTE/SAE operator's packet core network 100 is enabled. It is assumed that the registration to the default SAE bearer services using an IP address from the SAE GW 108 is available, even if not necessarily used for active sessions.

Local breakout services providing Internet protocol gateway services can be provided via local IP gateways 170 to 172. The IP gateways 170 to 172 may reside, for example, in a corporate network 144 or in a specific local area 142, such as a city area. This provides optimal data routing such that all data is not required to traverse via the centralized SAE GW 108. For example, a solid line 190 illustrates how the local breakout service is provided for a mobile terminal 150. This way, direct terminal-to-terminal communications (e.g. between 150 and 151), terminal-to-local services and terminal to Internet become possible within the local breakout service area.

The serving base station 160, 161 of the mobile terminal 150, 151 is configured to establish a radio bearer for the local breakout service and to provide the local breakout service to the Internet protocol gateway 170, 171, 172 while retaining user access control and a remote Internet protocol gateway of a packet core network 100 of the public mobile network for the mobile terminal 150, 151.

The scope of IP connectivity via the local IP breakout service may be anything from one LTE cell/base station 160 to 165 to a tracking area that is formed of multiple neighboring LTE cells/base stations covering the following cases: direct connectivity to Internet from a home LTE cell/base station in a similar manner as using WLAN access point and DSL modem (could be the nearest LTE cell at home, not necessarily inside the house but e.g. a designated cell in the neighborhood); an enterprise network providing Intranet connectivity to local services and a direct connectivity to the Internet via the enterprise gateway. "Femto" LTE base stations could be applied for improving indoor coverage in corporate premises that with nearby public LTE cells/base stations form a local breakout tracking area in which cells may be shared by LTE/SAE users using SAE GW services; a local zone (e.g. shopping center, city area etc.) comprising multiple cells/base stations forming a tracking area that is shared by LTE/SAE users and local IP breakout users.

In order to provide mobility within the local IP breakout area, the network must inform the mobile terminal 150, 151 about neighboring LTE Cells in which the local IP breakout service may continue. The network can indicate the list of neighboring cells and tracking area Id in conjunction with an initial attach procedure, network entry to local breakout service, or in ordinary handover related measurement control from the LTE base station to the mobile terminal. Whether or not the local service area, i.e., the area where a local breakout service is available, is continuous within a geographical area is a matter of network planning by the operator.

In an embodiment, means for enabling a solution for active mode, e.g. LTE_ACTIVE mode, mobility scenario for LTE H-NB (or any LTE eNB providing a local IP breakout service) to LTE MACRO handover when the UE is using an ordinary IP gateway (access router) for local IP breakout services directly from a LTE base station while retaining user access control in the LTE/SAE operator's packet core is provided. It is assumed that the registration to the ordinary SAE Bearer services using an IP address from the SAE GW is available in parallel, even if not necessarily used for active sessions.

In an embodiment, it is assumed that the current local IP breakout service related IP sessions can be made to continue outside of the LBO service area, e.g. in LTE macro cells until they terminate normally or the UE will be moved to LTE Idle state. The Local IP breakout service (LBO) is usually configured to be available via neighboring LTE cells/base stations in a certain geographical area. These LBO cells may from an own tracking area (TA) in the radio network topology that may overlap with the upper macro layer TA.

Figure 3:
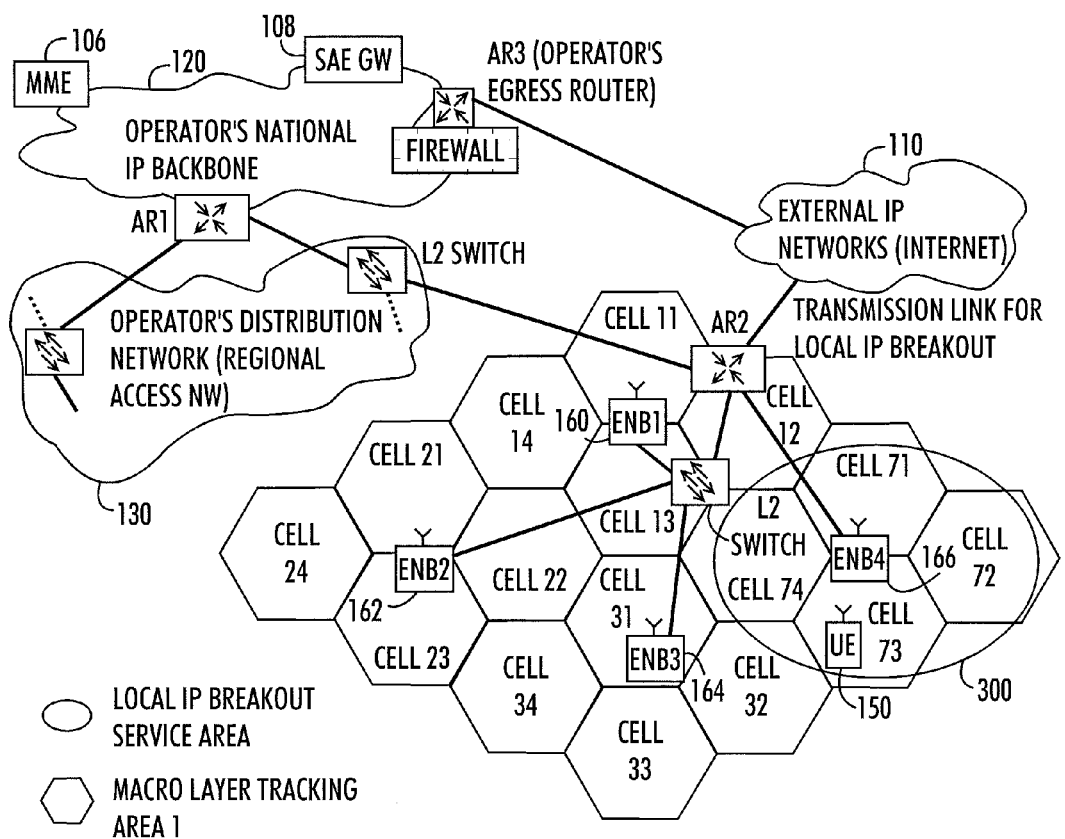
FIG. 3 illustrates an example of local IP breakout service area in radio and transport network topologies.

At the IP transport network layer, the LTE Base Stations for the local IP breakout service may be connected to the same IP sub-network, or IP routing area depending on the Local IP GW location in the IP network topology. In this way, the IP Address that the UE obtains from the local IP gateway is topologically correct within the LBO service coverage area and enables to use IT technology standard L2 switching, native IP rouging or IP tunneling on the user plane. Now also the session continuation is possible as the IP address need not be changed while the UE movements are within the LBO service area. The exemplary radio system of FIG. 3 illustrates a local IP breakout service area in radio and transport network topologies.

In order to provide session continuation for mobility out of the local IP breakout service area, the following functions may be required:

The network is configured to guide the UE by giving a list of neighboring cells in which the local IP breakout service can be activated, or continue after activation. In an embodiment, the network indicates to the UE that the LBO service can continue also in a MACRO Cell belonging to another tracking area (TA) using network. session continuation for LBO services can be provided either by the network or UE controlled user plane tunneling for the user LBO traffic.

The user plane tunneling may be provided in different ways:
Network controlled user plane tunneling alternative 1: The local IP GW and the eNBs may support NETLMM protocol (proxy MIP) that is fully transparent to the UE, so it is not required to support mobile IP client. The required functions in the network are the following:
After the Inter eNB handover, the local IP gateway (home agent) becomes the mobility anchor for UE (the UE is at home when it is inside the LBO coverage area),
New macro eNB must support proxy MIP client and its IP address becomes the care-off address for UE (transparently to the UE),
The new macro eNB executes PMIP path switching with PMIP registration to the local IP GW (HA),
UE may use a dedicated radio bearer for LBO service that the macro eNB may establish and map e.g. to the local GRE tunnel (controlled by PMIP), and
Consecutive inter eNB handovers can be supported simply with PMIP client controlled proxy MIP registrations from new eNBs to the local IP GW.
Network controlled user plane tunneling alternative 2: A bi-directional user plane tunnel over X2 interface could be applied between the LBO eNB and the macro eNB. This solution resembles a bit the soft handover in WCDMA where the eNB in LBO area remains as the serving RNC and the new eNB provides the drift RNC function. The required functions are the following:

After the inter eNB handover, the latest eNB in the LBO area (or H-NB) remains as the mobility anchor for the UE,
New macro eNB must support bi-directional "extension" X2-tunneling for UE LBO service (transparently to the UE),
UE shall use a dedicated radio bearer for LBO service that the macro eNB maps to the local X2-tunnel (GTP or GRE), and
Consecutive inter eNB handovers would require implementation of path switching for the bi-directional X2-tunnel in the eNBs (not a standard LTE function).
Network controlled user plane tunnelling alternative 3: session continuation can be provided by using GTP-tunneling between the latest eNB in the LBO area (or H-NB) and the SAE GW. The required functions are the following:
Latest eNB in the LBO area (or H-NB) remains as the mobility anchor for LBO services,
The network must support "extension" GTP-tunnel from the SAE GW to the latest eNB in the LBO area for the UE (i.e. this is like a remote connection case to a corporate network via the SAE GW), and
SAE GW is relaying LBO traffic from/to "extension" GTP-tunnel for the UE using a dedicated SAE bearer to new macro eNB.
UE Controlled user plane tunnelling: session continuation is provided by using MIP client in the UE and the local IP GW (home agent). The client MIP is fully transparent to the LTE/SAE network, so it is not required to support mobile IP in this case. The required functions are the following:
Local IP gateway must support mobile IP home agent (HA) function and becomes a mobility anchor for the UE,
UE must support MIP client and use its IP address from the SAE GW as the care-off address for the LBO service (implication on the terminal IP stack),
Network may establish a dedicated SAE bearer for UE LBO service, or the default SAE bearer could be used as well, and
UE shall perform MIP registration to the local IP gateway (HA) transparently to the SAE GW when user plane connectivity is obtained in the target eNB outside the LBO coverage area.

Figure 2:
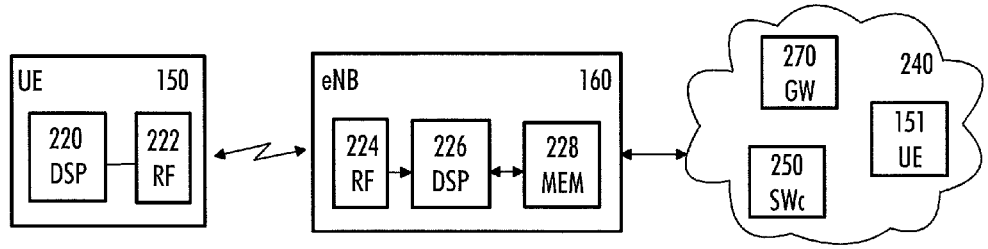
FIG. 2 illustrates an example of a mobile terminal, a base station, and an IP subnet.

FIG. 2 illustrates an example of a mobile terminal, a base station, and an IP subnet. The mobile terminal 150 comprises a communication unit 222 configured to communicate with one or more base stations 160 of a public mobile network, and a processing unit 220 for controlling the functions of the mobile terminal. The processing unit 220 is typically implemented with a microprocessor, a signal processor or separate components and associated software. The mobile terminal 150 further comprises (e.g. in the processing unit 220): a detection unit configured to detect availability of a local breakout service to an Internet protocol gateway 270; a processing unit configured to start a network entry to the local breakout service; and a configuration unit configured to configure an Internet protocol stack of the mobile terminal on the basis of received configuration data in order to enter the local breakout service to the Internet protocol gateway while retaining user access control and a remote Internet protocol gateway of a packet core network of the public mobile network for the mobile terminal.

The base station 160 of a public mobile network comprises: a communication unit 224 configured to communicate with at least one mobile terminal 150, and with a local breakout service network 240 providing Internet protocol gateway services. The base station further comprises: a processing unit configured to provide the local breakout service to the Internet protocol gateway while retaining user access control and a remote Internet protocol gateway of a packet core network of the public mobile network for the mobile terminal.

In an embodiment the base station 160 is further configured: to provide information on neighboring macro cells in which the local breakout service can continue, the macro cells belonging to a network using another Tracking Area than that of the serving cell of the mobile terminal; to execute a handover process of the mobile terminal from the source base station to a target base station in a neighboring macro cell; and to provide uninterrupted session continuation of the mobile terminal local breakout service traffic in the neighboring macro cell by controlling user plane tunneling between the target base station and the local packet switched network from which an Internet protocol address for the local breakout service was assigned. The processing unit 226 is typically implemented with a microprocessor, a signal processor or separate components and associated software. The base station 160 may also include a memory 228 and other elements.

The local breakout service can be provided, for example, to a local network 240 that enables direct UE-to-UE (between 150 and 151) communications, UE-to-local servers and an Internet connection (direct routing). The local network 240 can be, for example, an enterprise network, a shopping center, a city center, a gaming zone, municipal services, a base station sharing with a local operator, a home cell (nearby the base station), an indoor "Femto eNB" at home. The mobile terminal 150 is able to use a local IP address for direct IP connectivity from the base stations to the Internet, enterprise networks, regional or direct UE to UE services. No cellular operator owned special Gateway nodes are required in 3$^{rd}$ party premises. Existing packet switched trans-port equipment, such as IP routers and LAN switches 250 and IETF compliant servers, can be applicable.

In an embodiment, the mobile terminal 150 is configured to communicate with a source base station 160 in the local breakout service area and a target base station in a neighboring macro cell outside the local breakout service area, to support uninterrupted session continuation of the mobile terminal local breakout service traffic in the neighboring macro cell.

The following chapters describe embodiments of the session continuation solution in detail for a local IP breakout. An LBO service area may be geographically small, so there is a high probability that the user moves out of the service area and the related sessions can break. Such a limited mobility may be accepted due to the nature of the LBO service and that the SAE bearer services are assumed to be available in parallel. However, in LTE it is a question about a carrier grade system, so it would be beneficial to consider a solution that enables to continue an LBO session outside its usual coverage area until the user terminates it normally.

From the LTE base station point of view it is possible to establish a dedicated radio bearer for the LBO services even if the cell/base station is not configured to belong to the LBO service area. The problem is on the user plane routing as the UE should be reachable via the cell/LTE base station by using an IP address that is topologically wrong. The only known solutions are to apply IP tunneling or host routes. The latter may work with static routes but becomes questionable in mobile networks where the route must be updated frequently on every inter base station handover and the amount of host routes would explode.

The local IP GW function for the LBO services could be provided by:
the LTE base station working as a wireless IP router,
the next hop access router (AR) to the LTE base station (connected to a link/interface forming an IP subnet/L2 switched network e.g. Ethernet LAN),
an access router behind multiple router hops from the LTE base station.

1 LTE Base Station Working as a Wireless IP Router

When the LTE base station (eNB) provides an integrated next hop router function for the local IP breakout service, i.e. it is itself the local IP gateway (an access router, or could be considered a node where the PDN (packet data network) SAE GW and the eNB are integrated), then the UE mobility with IP session continuation is normally limited to LTE cell(s) within this LTE base station. Now the UE movement out of these cells to another LTE base station would cause an IP session break.

Due to its most limited IP mobility, this use case would be suitable only for providing a local IP breakout service from the subscriber's home either using a nearby LTE base station, or a cheap indoor base station (Home eNB) and a fixed broadband Internet connection e.g. xDSL.

In case the session continuation out of the LBO service area will be provided with a "Wireless IP Router", then a link layer based solution must be applied e.g. using the X2 interface for bi-directional user plane tunneling. Now the Home eNB remains as a user plane anchor at IP layer and an extension tunnel is established over X2-u.

2 LTE Base Station and External Access Router in the Same LAN/IP Subnet

The local IP GW for the LBO services can be provided by the default gateway from the same LAN/IP subnet where the LTE base station is connected. Now the user plane within this LAN/IP subnet can work using L2 switching (e.g. IP over Ethernet) instead of IP routing. Thus there is no need to apply IP tunneling, and mobility within the LAN/IP subnet can be implemented by using L2 switched technologies.

In the best cases the L2 switched network could be a wide area network, e.g. metro Ethernet covering a whole city when the IP session continuation for LBO services work for the most cases without problems. However, it is possible that some users may move at the border of the service coverage area when a session continuation out of the LBO service area should be supported.

Now in this case it is possible to apply alternative tunneling solutions by keeping the user plane anchor in the eNB, or in the local IP GW (the latter requires mobile IP HA function in the access router).

3 LTE Base Station and External Access Router Behind Multiple Router Hops

The local IP GW for the LBO services can be provided by an access router that is located behind multiple router hops from the eNB. However, it is assumed that it is located much closer in IP network topology than the centralized SAE GW. Now the user plane must work using IP routing, so there will be required IP tunneling or use host routes. The latter is not applicable in mobile system where routes change frequently, so only some IP tunneling based solution is feasible.

The 3GPP standard GTP-tunneling and a low cost "Femto" SAE GW could be applied but on the other hand, we assume that the LBO concept can rely on the already installed IT infrastructure. Thus also IETF protocol based solutions that use standard access routers as the Local IP GW should be supported as well.

The link layer based solutions are out of question with the standard IP routers. Usually the IP tunnels are configured in the routers being static in similar manner as the host routes. These are not applicable in a case where dynamic IP tunnels will be required. Currently only mobile IP or proxy mobile IP can provide proper means for supporting dynamic IP tunnels in mobile systems. Thus the local IP GW must provide mobile IP home agent (HA) function for supporting mobile IP tunneling when the UE happens to move out of the LBO service coverage area (UE goes out of home network). In LBO this can be utilized likely by using proxy MIP where the eNB provides the proxy MIP client (i.e. terminates the MIP tunneling) so that the tunneling overhead will not be exposed over the radio interface.

The following chapters describe and compare four alternative IP tunneling based solutions in order to support IP session continuation for the local IP breakout services when the UE moves out of the ordinary service coverage area.

4 Initial Data Path for Local IP Breakout Service

The local IP GW is selected and the IP connectivity for a local IP breakout service is established during the network entry to local IP breakout service procedure. The data path establishment may be different depending on the local IP GW location.

4.1 Initial Data Path with "Wireless IP Router"

When the eNB provides a "Wireless Router" function for the local IP breakout service, then the eNB itself is the local IP GW and the initial data path is simply the dedicated radio bearer for the LBO service over the radio interface. Now the user IP breaks out directly from the eNB to the local IP routed network, i.e. communications with other peers shall work using "native IP" routing (no pre-established data paths per a host).

4.2 Initial Data Path with LTE Base Station and External Access Router in the Same LAN/IP Subnet When the local IP GW for the LBO services is provided by the default gateway (access router) from the same LAN/IP subnet where the LTE base station is connected, the UE IP address must be obtained from this IP subnet address space and its corresponding link layer address (LLA), e.g. Ethernet MAC address, must be informed to the default gateway and to the neighboring IP hosts connected to the same LAN in order to enable IP forwarding over the link layer.

According to IETF standards, this works using ARP (address resolution protocol) with IPv4 and neighbor discovery (ND) procedures with IPv6.

It may be assumed that the LTE radio interface provides its own link layer mechanism and the access link interface in the eNB, e.g. Ethernet, shall not be exposed to the UE. Now the eNB must behave in the access link as a proxy to the UE with ARP or ND towards the default gateway and other hosts in the same link (UE becomes associated with the eNB's network interface).

The UE may be associated with its dedicated LLA or use eNB's LLA. The latter is preferred because the number of LLAs stored into forwarding tables in the L2 switches can be kept smaller (there are memory limitations in low cost L2 switches). The drawback of using eNB LLA is that the neighboring cache of the default GW and hosts in the same link must be updated on every inter eNB handover as the LLA associated to the UE IP address changes.

Anyway when the initial data path will be established the eNB shall establish a dedicated radio bearer for the LBO service over the radio interface and the eNB proxies the LLA address using ARP or ND towards its network interface. Now any other peer that knows UE IP address can initiate communications with the UE when required.

4.3 Initial Data Path with LTE Base Station and External Access Router Behind Multiple Router Hops When the local IP GW is selected from an external access router (AR) that is located behind multiple router hops, the eNB must create IP tunnel to the HA in the AR using proxy MIP protocol that is linked to the dedicated radio bearer for the LBO service over the radio interface. The actual IP tunneling protocol could be e.g. GRE (generic routing encapsulation) that is applicable both for IPv4 and IPv6.

With this solution the UE movement out of the LBO service area is easy because the Inter eNB handover can be performed using the very same handover sequence with PMIP controlled GRE-tunnel switching and using X2 interface at access link layer between the eNBs.

The only condition is that the target eNB must support PMIP client and a dedicated RB for the LBO service even if itself is not configured to belong to the LBO service coverage area. The required information about the LBO service can be moved to the target eNB over the X2-c interface among the user context data that is transferred in handovers.

4.4 Example of Initial Data Path with LBO Service

Figure 4:
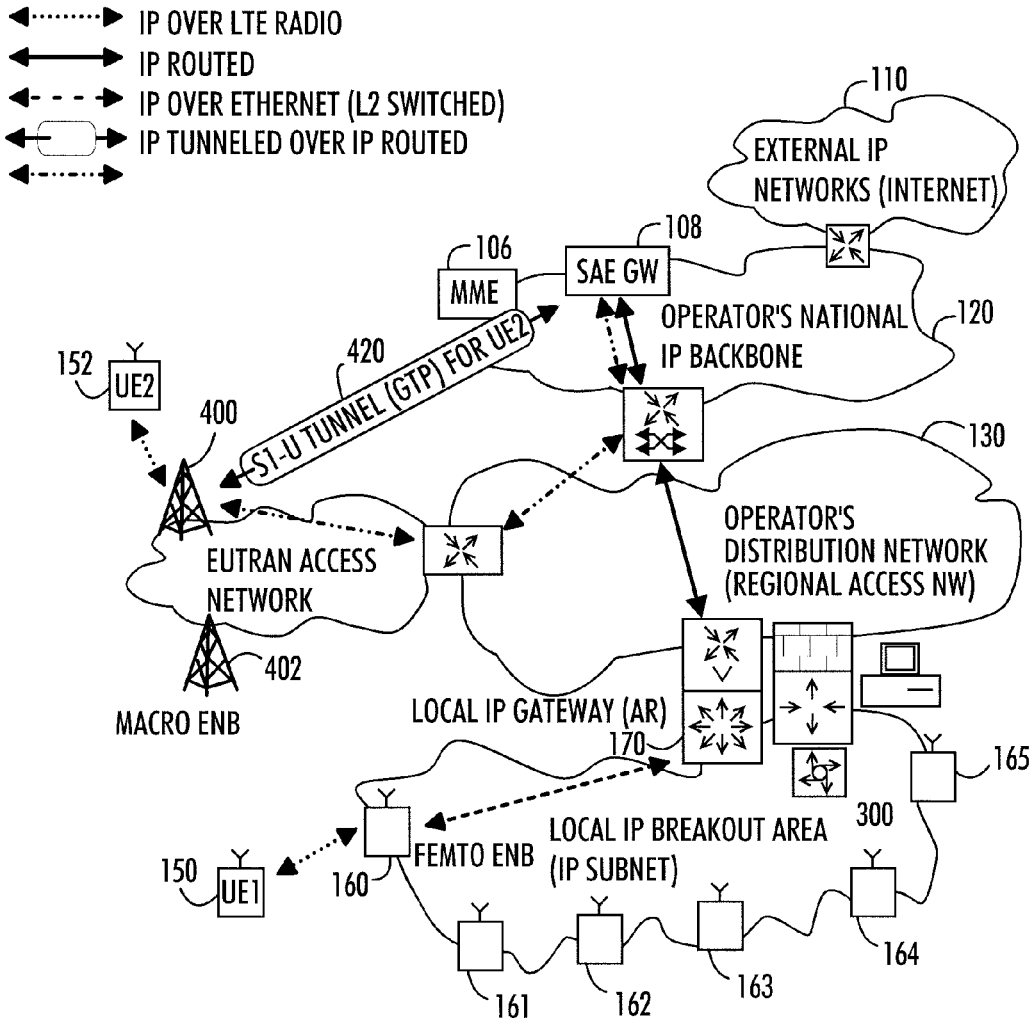
FIG. 4 illustrates an example of an initial data path with LBO service.

FIG. 4 illustrates an example of an initial data path with LBO services where:

The UE1 150 has a local IP breakout service activated via the local IP gateway 170, UE1 150 is communicating with UE2 152 that has activated a SAE bearer service via the SAE GW 108, Femto eNB 160 provides a dedicated radio bearer for UE1 150 LBO service and proxies (ARP or neighbor discovery) the UE1 150 towards the access link and the local IP gateway (AR) 170, and There is an optimal route between the Femto eNB 160 and the SAE GW 108 that connects to the UE2 152 using ordinary S1-U tunneled SAE bearer 420.

While the UE1 150 moves within the local IP breakout area 300 (IP subnet) the local forwarding can be controlled in Inter eNB handovers by proxy ARP or ND from the eNBs and no changes in routing outside the default gateway (AR) will be exposed.

5 Session Continuation Using Proxy MIP

Figure 5:
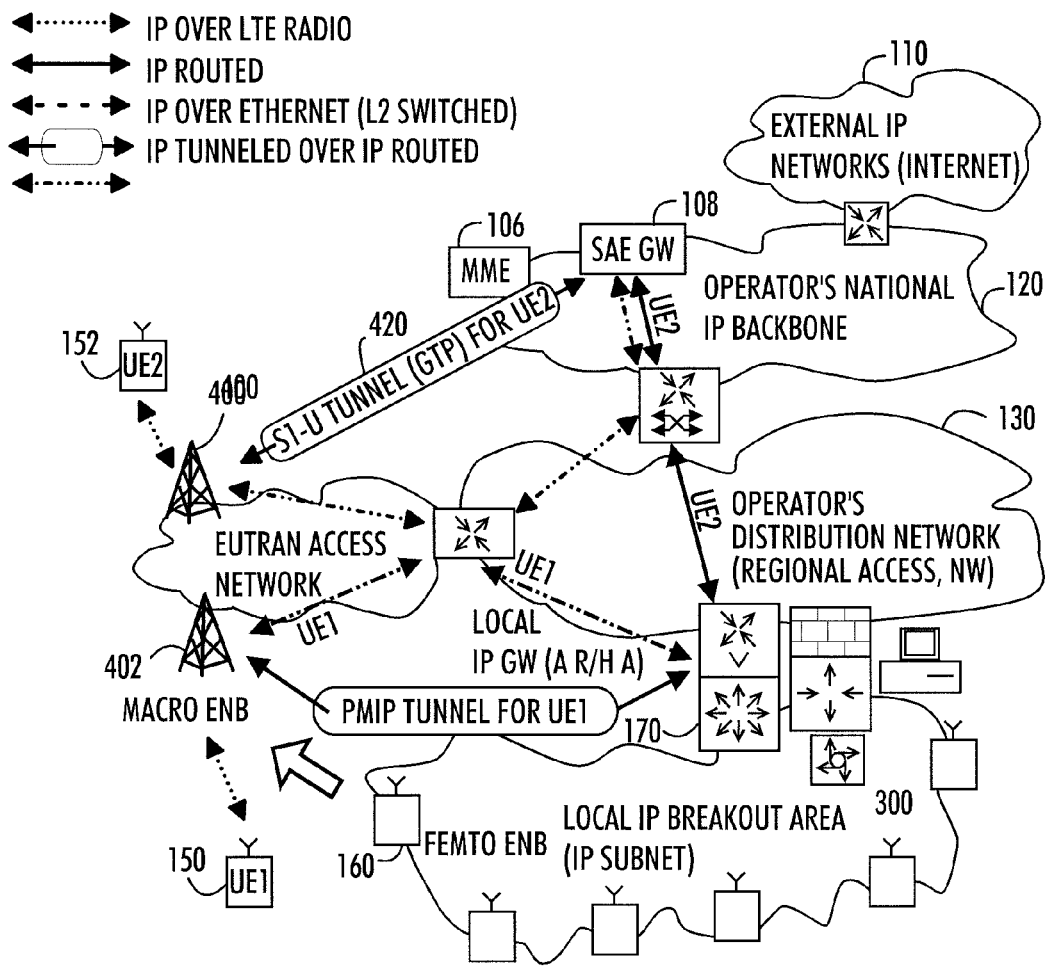
FIG. 5 illustrates an example of data path after Inter eNB handover outside the LBO service area using PMIP.

FIG. 5 illustrates the new data path after UE movement outside LBO area (IP subnet) when session continuation is provided by using network controlled proxy MIP (NETLMM) in the eNBs and the local IP GW. The PMIP is fully transparent to the UE, so it is not required to support mobile IP client. The required functions in the network are the following:

After the Inter eNB handover, the local IP gateway (HA) 170 becomes the mobility anchor for UE1 150 (the UE1 150 is at home when it is inside the LBO area 300), New macro eNB 402 must support proxy MIP client and its IP address becomes the CoA for UE1 150 (transparently to the UE), The new macro eNB 402 executes PMIP path switching with PMIP registration to the local IP GW (AR/HA) 170, UE1 150 shall use a dedicated radio bearer for LBO service that the macro eNB 402 shall establish and map to the local GRE tunnel (controlled by PMIP), and Consecutive Inter eNB handovers can be supported simply with PMIP client controlled proxy MIP registrations from new eNBs 400, 402 to the local IP GW 170.

As the local IP GW (HA) 170 becomes the mobility anchor that routes user data to a tunnel pointing to a Macro eNB 400, 402 outside the local IP breakout area (IP Subnet) 300, this solution provides the shortest routing path and no tunneling overhead is exposed over the radio (proxy MIP client encapsulates user data in the macro eNB).

Figure 6:
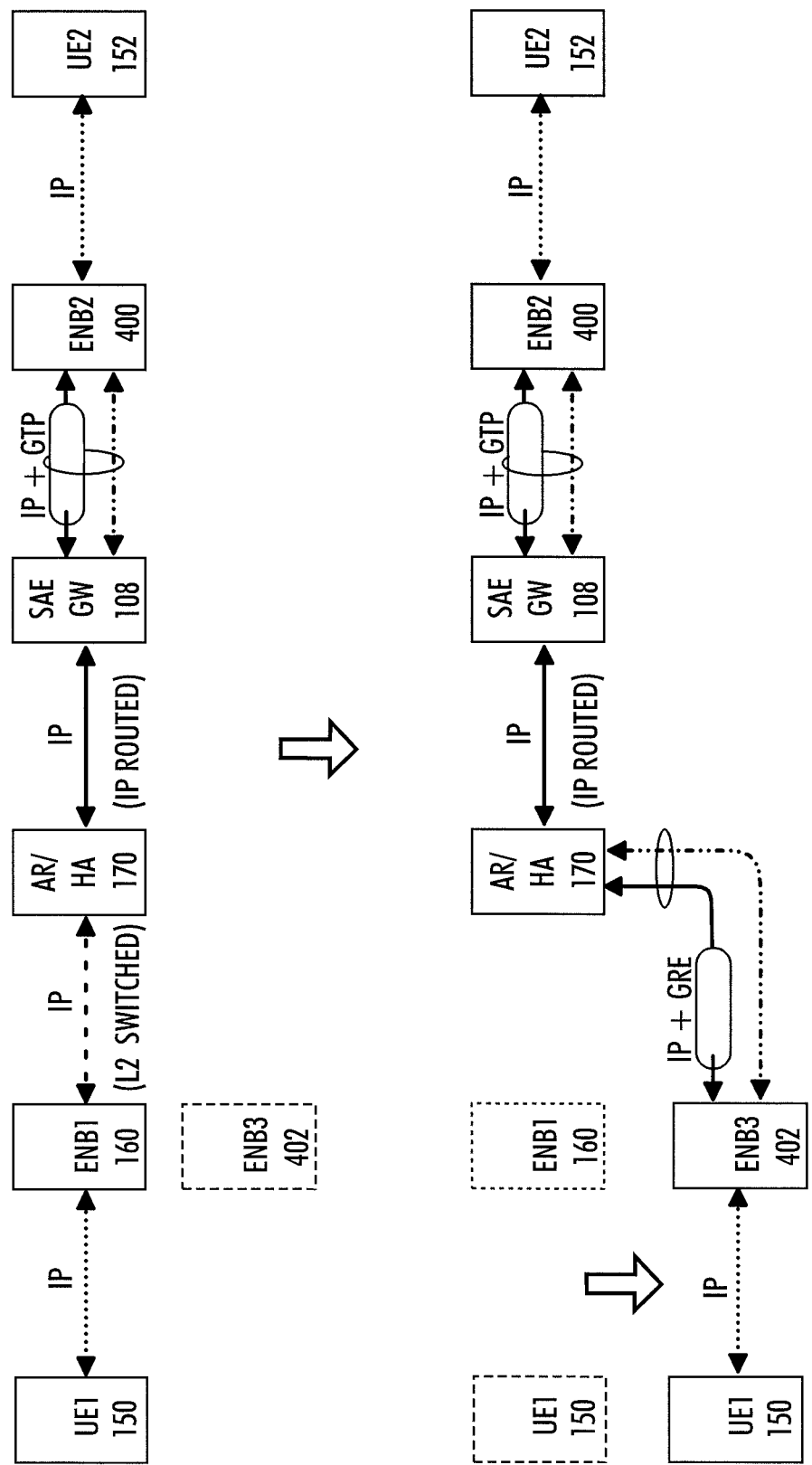
FIG. 6 illustrates an example of data paths in Inter eNB handover outside the LBO service area using PMIP.

FIG. 6 illustrates the initial and the new data path after the handover when eNBs and local IP GW support PMIP (NETLMM). The initial data path with LBO service is illustrated by the upper data path, and the data path after an inter eNB handover outside the LBO service area is illustrated by the lower data path.

FIG. 7 illustrates a signaling flow for inter eNB handover outside the LBO service area using PMIP.

The inter eNB handover is executed according to the 3GPP standard using X2 interface between the eNBs and using S1 interface towards the MME/SAE SW in order to perform path switching for the SAE bearer services.

Based on a measurement report received from the UE (in 1), the source eNB makes a handover decision to move the UE to a cell in target eNB.

The target eNB that does not belong to the LBO service coverage area in the radio network topology receives the LBO related information in the handover request message (in 2) from the Source eNB and prepares resources for the LBO service (dedicated radio bearer). The target eNB stores UE RAN Context, configures the LBO service, reserves RLID, and sends a handover response message to the source eNB (in 3). The source eNB transmits a handover command to the UE in 4 after which the UE is detached from the old cell and L1 is synchronized to the new cell. The source eNB delivers buffered and in transit downlink packets to the target eNB and the target eNB prepares to receive forwarded data from the source eNB.

When the radio handover is executed (UE has obtained radio link connectivity in 5), the target eNB detects based on the LBO information that it must initiate a PMIP client function and establish user plane tunnel by sending a proxy binding update message (in 7) to the local IP GW (HA). In 6, a relocation indication is sent from the target eNB to the MME/SAE GW.

After the local IP GW has replied with the proxy binding acknowledge (in 8), the user data for the LBO services shall traverse in path between the target eNB and the local IP GW using e.g. GRE-tunneling. Now the current LBO session can be continued as IP address/APN for the LBO services need not to be changed.

The UE detects (or has detected already upon handover command) that the target cell does no more belong to the same tracking area (TA) in which the LBO service is provided normally and starts a timer for retaining LBO service resources. The network is assumed to allow UE re-entry to the cells/eNBs in the LBO service coverage area before the LBO resource retain timer expires without need to perform the full initial entry procedure to the local IP breakout services.

As the UE is out of normal LBO service coverage area, it shall set the IP address/APN for the SAE bearer services as the primary for the new UE originated sessions.

A relocation acknowledge message is received from the MME/SAE GW in 9 and the target eNB indicated the source eNB about the completed handover in 10.

The same signaling flow can be applied also for the consecutive Inter eNB handovers if the UE moves to another eNB outside the actual LBO service coverage area.

The extension tunnel for the LBO services should be released in the network when the pending LBO sessions are terminated in the UE, or it is moved to LTE_IDLE state as LBO service continuation for new sessions is not expected while the UE has moved out of service coverage area.

6 Session Continuation Using Bi-Directional Tunnel Over X2

FIG. 8 illustrates the new data path after UE movement outside LBO area (IP subnet) when session continuation is provided by using bi-directional user plane tunnel over X2 interface between the eNBs. The required functions are the following:

After the inter eNB handover the latest eNB 160 in LBO area 300 remains as the mobility anchor for UE1 150, New macro eNB 402 must support bi-directional "extension" X2-tunneling 440 for UE1 LBO service (transparently to the UE), UE1 150 may use a dedicated radio bearer for LBO service that the macro eNB 402 maps to the local X2-tunnel (GTP or GRE), and Consecutive inter eNB handovers would require implementation of path switching for the bi-directional X2-tunnel in the eNBs (not a standard LTE function).

This solution resembles a bit the soft handover in WCDMA where the eNB in LBO area remains as the serving RNC and the new eNB provides the drift RNC function.

As the latest eNB 160 in the LBO area becomes the mobility anchor that routes user data to a tunnel 440 pointing to a macro eNB 402 outside the local IP breakout area (IP subnet), the user data must traverse from local IP GW to the Femto eNB and back. Thus this solution does not provide as optimal routing path as the PMIP based solution. However, there will not be exposed any tunneling overhead over the radio like in the client MIP based solution.

FIG. 9 illustrates the initial and the new data path after the handover when eNBs support bi-directional X2-tunnel. The initial data path with LBO service is illustrated by the upper data path, and the data path after an inter eNB handover outside the LBO service area is illustrated by the lower data path.

FIG. 10 illustrates a signaling flow for inter eNB handover outside the LBO service area using a bi-directional X2-tunnel.

The inter eNB handover is executed according to the 3GPP standard using an X2 interface between the eNBs and using an S1 interface towards the MME/SAE SW in order to perform path switching for the SAE bearer services.

The target eNB that does not belong to the LBO service coverage area in the radio network topology receives the LBO related information including parameters for bi-directional X2-tunnel in the handover request message (in 2) from the source eNB and prepares resources for the LBO service (dedicated radio bearer and X2-tunnel).

When the radio handover is executed (UE has obtained radio link connectivity in 5) the target eNB starts to deliver the local IP breakout service data using a dedicated radio bearer over the radio interface and the bi-directional X2-tunnel in the access network.

When the source eNB receives the handover completed indication, it shall release all the SAE bearer related resources but continues the bi-directional X2-tunnel service for the user LBO traffic (i.e. remains as mobility anchor on the user plane).

In case the LBO session continues so long that the UE must make another handover, the new target eNB must perform X2-tunnel switching with the mobility anchor eNB for the LBO services. This can be utilized by sending a "X2-tunnel switching command" containing new tunnel end-point parameters to the LBO anchor eNB that is executed in parallel with the relocation indication to the MME/SAE GW. This would require adding new elementary procedure into X1AP protocol specification in 3GPP.

Again the bi-directional X2-tunnel should be released in the network when the pending LBO sessions are terminated in the UE, or it is moved to LTE_IDLE state.

7 Session Continuation Using GTP-Tunnel Via the SAE GW

FIG. 11 illustrates the new data path after UE movement outside LBO area (IP subnet) when session continuation is provided by using GTP-tunneling between the latest eNB 160 in the LBO area and the SAE GW 108. The required functions are the following:

- Latest eNB 160 in the LBO area 300 remains as mobility anchor for UE1 150,
- The network must support "extension" GTP-tunnel 450 from the SAE GW 108 to the latest eNB 160 in the LBO area for the UE1 150 (i.e. this is like a remote connection case to a corporate network via the SAE GW),
- SAE GW 108 is relaying LBO traffic from/to "extension" GTP-tunnel for UE1 150 using a dedicated SAE bearer to new macro eNB 402, and
- Requires modifications in the SAE GW 108.

This solution shall cause the longest routing path as user data must traverse via three GTP-tunnels 420, 450, 460 forth and back. These are two S1-u tunnels 420, 450 for each UE 150, 152 to the SAE GW 108 and the third tunnel 460 down to the latest eNB 160 in the LBO area 300 that kind of becomes the PDN SAE GW for the LBO services and the SAE GW in the core network becomes the serving SAE GW.

FIG. 12 illustrates the initial and the new data path after the handover when GTP-tunnel via the SAE GW is applied. The initial data path with LBO service is illustrated by the upper data path, and the data path after an inter eNB handover outside the LBO service area is illustrated by the lower data path.

The establishment of the "extension" GTP-tunnel between the SAE GW and the latest eNB in the LBO area will require control from the MME/SAE GW as illustrated in the MSC diagram of FIG. 13.

The Inter eNB handover is executed according to the 3GPP standard using X2 interface between the eNBs and using S1 interface towards the MME/SAE SW in order to perform path switching for the SAE bearer services.

The Target eNB that does not belong to the LBO service coverage area in the radio network topology receives the LBO related information in the handover request message (in 2) from the source eNB and prepares resources for the LBO service (dedicated radio bearer).

The relocation indication message (in 6) to the MME/SAE GW contains the LBO Info indicating UE movement out of the LBO service area. Now the MME initiates the "extension" GTP-tunnel establishment via the SAE GW to the source eNB by sending the update UE context message (in 9).

The source eNB becomes like the PDN SAE GW to the LBO services and starts forwarding LBO data to the newly established GTP-tunnel while releasing all the former SAE bearer related resources.

In case the LBO session continues so long that the UE must make another handover outside the LBO area, the new target eNB must perform only ordinary S1-u tunnel switching with the SAE GW as the extension tunnel for the LBO services remains unchanged between the SAE GW and the latest eNB in the LBO area.

Again the extension GTP-tunnel should be released in the network when the pending LBO sessions are terminated in the UE, or it is moved to LTE_IDLE state.

8 Session Continuation Using Client MIP

FIG. 14 illustrates the new data path after UE movement outside LBO area (IP subnet) when session continuation is provided by using MIP client in the UE and the local IP GW (home agent). The client MIP is fully trans-parent to the LTE/SAE network, so it is not required to support mobile IP in this case. The required functions are the following:

- Local IP gateway 170 must support mobile IP home agent (HA) function and becomes a mobility anchor for UE1 150,
- UE1 150 must support MIP client and use its IP address from the SAE GW 108 as the CoA for the LBO Service (implication on the terminal IP stack),
- Network may establish a dedicated SAE bearer for UE1 150 LBO service, or the default SAE bearer could be used, and
- UE1 150 may perform MIP registration to the local IP gateway (HA) transparently to the SAE GW when user plane connectivity is obtained in the target eNB 402 outside the LBO coverage area.

This solution may cause a long routing path as user data must traverse via three tunnels 420, 450, 470 forth and back. These are two S1-u tunnels 420 and 450 for each UE 150, 152 to the SAE GW 108 and the third MIP tunnel 470 from the UE1 150 down to the latest eNB 160 in the LBO area.

As the MIP tunnel 470 is terminated in the UE1 150, its tunneling overhead is exposed over the radio and the S1-U interfaces, i.e. there will be double tunneling overhead over the S1-u interface (GTP+MIP).

FIG. 15 illustrates the initial and the new data path after the handover when client mobile IP is applied. The initial data path with LBO service is illustrated by the upper data path, and the data path after an inter eNB handover outside the LBO service area is illustrated by the lower data path.

FIG. 16 illustrates a signaling flow for Inter eNB handover outside the LBO service area using client mobile IP.

The inter eNB handover is executed according to the 3GPP standard using X2 interface between the eNBs and using S1 interface towards the MME/SAE SW in order to perform path switching for the SAE bearer services.

The Target eNB that does not belong to the LBO service coverage area in the radio network topology receives the LBO related information in the handover request message (in 2) from the source eNB and may prepare resources for the LBO service (dedicated radio bearer).

The Relocation indication message (in 6) to the MME/SAE GW contains the LBO Info indicating UE movement out of the LBO service area. Now the MME may initiates establishment of a dedicated SAE Bearer for traffic to/from the Local IP GW (HA) in the LBO area.

The UE detects its movement out of the LBO service coverage area and configures its IP address for the SAE bearer services as the mobile IP care-of address for its IP address assigned for the LBO services that becomes the mobile IP home address.

When the UE has obtained user plane connectivity for its SAE bearer services, it is able to send the mobile IP registration (binding update) to the local IP GW (HA).

The local IP GW acknowledges the registration with a binding acknowledge message (in 12). From now on the user data for the LBO services starts to traverse using the MIP tunnel between the UE and the local IP GW).

In case the LBO session continues so long that the UE must make another handover staying outside the LBO area, the new target eNB must perform only ordinary S1-u tunnel switching with the SAE GW as the MIP tunnel for the LBO services remains unchanged as the CoA assigned from the SAE GW does not change.

Again the UE should release (de-register) the MIP tunnel when the pending LBO sessions are terminated in the UE, or it is moved to LTE_IDLE state.

The FIG. 17 shows an example of a method according to an embodiment of the invention. The method starts in 1700. In 1702, a local breakout service is provided to an Internet protocol gateway while retaining user access control and a remote Internet protocol gateway of a packet core network of a radio network for a mobile terminal. In 1704, information on neighboring macro cells in which the local breakout service can continue, the macro cells belonging to a network using another tracking area than that of the serving cell of the mobile terminal. In 1706, a handover process of the mobile terminal from a source base station in the serving cell of the mobile terminal to a target base station in a neighboring macro cell is executed based on received measurement reports from the mobile terminal. In 1708, uninterrupted session continuation of the mobile terminal local breakout service traffic in the neighboring macro cell is provided by controlling user plane tunneling between the target base station and the radio network. The method ends in 1710.

The embodiments of the invention may be realized in a network element comprising a controller. The controller may be configured to perform at least some of the steps described in connection with the flowcharts of FIGS. 6, 7, 9, 10, 12, 13, 15 and 16 and in connection with FIGS. 1-5, 8, 11, 14 and 17. The embodiments may be implemented as a computer program comprising instructions for executing a computer process. The computer process comprises: providing a local breakout service to an Internet protocol gateway while retaining user access control and a remote Internet protocol gateway of a packet core network of a radio network for a mobile terminal; providing information on neighboring macro cells in which the local breakout service can continue, the macro cells belonging to a network using another tracking area than that of the serving cell of the mobile terminal; executing a handover process of the mobile terminal from a source base station in the serving cell of the mobile terminal to a target base station in a neighboring macro cell; and providing uninterrupted session continuation of the mobile terminal local breakout service traffic in the neighboring macro cell by controlling user plane tunneling between the target base station and the radio network.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
providing a local breakout service to a local Internet protocol gateway while retaining user access control in a packet core network and parallel packet data services to a remote Internet protocol gateway of the packet core network of a radio network for a mobile terminal;
providing information on neighboring macro cells in which the local breakout service can continue, the macro cells belonging to a network using another tracking area than that of the serving cell of the mobile terminal;
executing a handover process of the mobile terminal from a source base station in the serving cell of the mobile terminal to a target base station in a neighboring macro cell; and
providing session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned.

2. The method of claim 1, further comprising: providing a local IP (internet protocol) gateway for the local breakout service to operate as a mobility anchor for the mobile terminal after the handover process; and routing, by the local IP gateway, the user data to a user plane tunnel pointing to the target base station in the neighboring macro cell.

3. The method of claim 2, further comprising: providing the IP address of the target base station as a care-off address for the mobile terminal.

4. The method of claim 2, further comprising: supporting a proxy MIP (mobile internet protocol) client by the target base station; and executing PMIP (proxy mobile internet protocol) path switching with PMIP registration to the local IP gateway by the target base station.

5. The method of claim 1, further comprising: providing the source base station in the local breakout service area remaining as a mobility anchor for the local breakout service after the handover; supporting bi-directional extension X2-tunneling for the mobile terminal local breakout service by the target base station; and providing a dedicated radio bearer for the local breakout service that is mapped to a local X2-tunnel.

6. The method of claim 1, further comprising: providing the source base station in the local breakout service area remaining as a mobility anchor for the local breakout service after the handover; supporting an extension GTP (general packet radio service tunneling protocol)-tunnel from a SAE (system architecture evolution gateway to the source base station in the local breakout service area for the mobile terminal; relaying, by the SAE gateway, local breakout service traffic from/to the extension GTP-tunnel for the mobile terminal using a dedicated SAE bearer to the target base station.

7. The method of claim 1, further comprising: supporting a mobile IP home agent function and providing a mobility anchor for the mobile terminal by a local IP gateway; supporting a MIP client and using its IP address from the SAE gateway as a care-off address for the local breakout service by the mobile terminal; providing a dedicated SAE bearer for the mobile terminal local breakout service; and performing, by the mobile terminal; MIP registration to the local IP gateway transparently to the SAE gateway when user plane connectivity is obtained in the target base station.

8. The method of claim 1, further comprising: initiating a re-entry timer when a mobile terminal movement out of the local breakout service coverage area is detected for retaining local breakout service related resources.

9. A non-transitory computer program distribution medium readable by a computer and encoding a computer program of instructions for executing a computer process, the process comprising:
providing a local breakout service to a local Internet protocol gateway while retaining user access control in a packet core network and parallel packet data services to a remote Internet protocol gateway of the packet core network of a radio network for a mobile terminal;

providing information on neighboring macro cells in which the local breakout service can continue, the macro cells belonging to a network using another tracking area than that of the serving cell of the mobile terminal;

executing a handover process of the mobile terminal from a source base station in the serving cell of the mobile terminal to a target base station in a neighboring macro cell; and providing session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned.

10. The computer program distribution medium of claim 9, the distribution medium including at least one of the following media: a computer readable medium, a program storage medium, a record medium, a computer readable memory, a computer readable software distribution package, a computer readable signal, a computer readable telecommunications signal, and a computer readable compressed software package.

11. A base station, the base station configured to function as a source base station in the serving cell of a mobile terminal of a radio network, or as a target base station in a macro cell belonging to a network using another tracking area than that of the serving cell of the mobile terminal, wherein the source base station comprises:
a communication unit configured to communicate with at least one mobile terminal and with a local breakout service network providing Internet protocol gateway services, the base station further comprising:
a processing unit configured to provide the local breakout service to the local Internet protocol gateway while retaining user access control in a packet core network and parallel packet data services to a remote Internet protocol gateway of the packet core network of the radio network for a mobile terminal;
a communication unit configured to provide information on neighboring macro cells in which the local breakout service can continue, the macro cells belonging to a network using another tracking area than that of the serving cell of the mobile terminal;
a processing unit configured to execute a handover process of the mobile terminal from the source base station to a target base station in a neighboring macro cell; and
a processing unit configured to provide session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned, and wherein the target base station comprises:
a communication unit configured to communicate with at least one mobile terminal, and with a local breakout service network providing Internet protocol gateway services, the base station further comprising:
a processing unit configured to execute a handover process of the mobile terminal from the source base station to the target base station; and a processing unit configured to provide session continuation of the mobile terminal local breakout service traffic in the macro cell by controlling user plane tunneling between the target base station and the local packet switched network where the local Internet protocol gateway is located and from which an Internet protocol address for the local breakout service was assigned.

12. A radio system comprising a source base station and a target base station:
the source base station in the serving cell of a mobile terminal configured to provide a local breakout service to a local Internet protocol gateway while retaining user access control in a packet core network and parallel packet data services to a remote Internet protocol gateway of the packet core network of a radio network for the mobile terminal; to provide information on neighboring macro cells in which the local breakout service can continue, the macro cells belonging to a network using another tracking area than that of the serving cell; and to make a handover decision based on measurement reports received from the mobile terminal;
a target base station in a neighboring macro cell configured to execute the handover process with the source base station of the mobile terminal once the handover decision has been made,
wherein the radio system is further configured to provide session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned.

13. The system of claim 12, the radio system further comprising a local IP (internet protocol) gateway for the local breakout service configured to operate as a mobility anchor for the mobile terminal after the handover process; and to route the user data to a user plane tunnel pointing to the target base station in the neighboring macro cell.

14. The system of claim 13, wherein the mobile terminal is further configured to initiate a re-entry timer when the mobile terminal movement out of the local breakout service coverage area is detected for retaining local breakout service related resources.

15. A mobile terminal for co-operation with a radio system, said radio system including a source base station and a target base station,
wherein the source base station in the serving cell of the mobile terminal is configured to provide a local breakout service to a local Internet protocol gateway while retaining user access control in a packet core network and parallel packet data services to a remote Internet protocol gateway of the packet core network of a radio network for the mobile terminal; to provide information on neighboring macro cells in which the local breakout service can continue, the macro cells belonging to a network using another tracking area than that of the serving cell; and to make a handover decision based on measurement reports received from the mobile terminal;
wherein the target base station in a neighboring macro cell is configured to execute the handover process with the source base station of the mobile terminal once the handover decision has been made, and
wherein the radio system is further configured to provide session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned, the mobile terminal comprising:

a communication unit configured to communicate with the source base station and the target base station, and a processing unit configured to provide session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned.

16. The mobile terminal of claim 15, wherein the mobile terminal is configured to use a dedicated radio bearer for the local breakout service established and mapped to a local GRE (generic routing encapsulation) tunnel by the target base station.

17. The mobile terminal of claim 15, wherein the mobile terminal is configured to use a dedicated radio bearer for the local breakout service mapped to a local X2-tunnel by the target base station.

18. The mobile terminal of claim 15, wherein the mobile terminal is configured to initiate a re-entry timer when the mobile terminal movement out of the local breakout service coverage area is detected for retaining local breakout service related resources.

19. A source base station according to claim 12 in the serving cell of a mobile terminal of a radio network, comprising:

a communication unit configured to communicate with at least one mobile terminal, and with a local breakout service network providing Internet protocol gateway services, the base station further comprising:

a processing unit configured to provide the local breakout service to the local Internet protocol gateway while retaining user access control in a packet core network and parallel packet data services to a remote Internet protocol gateway of a packet core network of the radio network for a mobile terminal;

a communication unit configured to provide information on neighboring macro cells in which the local breakout service can continue, the macro cells belonging to a network using another tracking area than that of the serving cell of the mobile terminal;

a processing unit configured to execute a handover process of the mobile terminal from the source base station to a target base station in a neighboring macro cell; and a processing unit configured to provide session continuation of the mobile terminal local breakout service traffic in the neighboring macro cell by controlling user plane tunneling between the target base station and the local packet switched network where the local Internet protocol gateway is located and from which an Internet protocol address for the local breakout service was assigned.

20. The source base station of claim 19, wherein the base station is configured to provide a list of neighboring cells and a tracking area Id from the base station to the mobile terminal in conjunction with an initial attach procedure, network entry to the local breakout service, or ordinary handover-related measurement control.

21. The source base station of claim 19, wherein the source base station is further configured to remain as a mobility anchor for the local breakout service after the handover.

22. A target base station according to claim 12 in a macro cell belonging to a network using another tracking area than that of the serving cell of the mobile terminal, the target base station comprising:

a communication unit configured to communicate with at least one mobile terminal, and with a local breakout service network providing Internet protocol gateway services, the base station further comprising:

a processing unit configured to execute a handover process of the mobile terminal from the source base station to the target base station; and a processing unit configured to provide session continuation of the mobile terminal local breakout service traffic in the macro cell by controlling user plane tunneling between the target base station and the local packet switched network where the local Internet protocol gateway is located and from which an Internet protocol address for the local breakout service was assigned.

23. The target base station of claim 22, wherein the base station is configured to exchange user data via a user plane tunnel between the target base station and a local IP (internet protocol) gateway for the local breakout service configured to operate as a mobility anchor for the mobile terminal after the handover process.

* * * * *

UNITED STATES PATENT AND TRADEMARK OFFICE
CERTIFICATE OF CORRECTION

PATENT NO. : 8,503,393 B2
APPLICATION NO. : 12/676922
DATED : August 6, 2013
INVENTOR(S) : Seppo Ilmari Vesterinen Page 1 of 1

It is certified that error appears in the above-identified patent and that said Letters Patent is hereby corrected as shown below:

In the Claims:

In Claim 6:
Column 18, line 43, "evolution" should be deleted and --evolution)-- should be inserted.

Signed and Sealed this
Fifteenth Day of October, 2013

Teresa Stanek Rea
*Deputy Director of the United States Patent and Trademark Office*